United States Patent
Shan

(10) Patent No.: US 11,122,505 B2
(45) Date of Patent: Sep. 14, 2021

(54) DOWNLINK DATA HANDLING FOR IDLE MODE UE WHEN THE SGW IS SPLIT INTO CONTROL PLANE NODE AND USER PLANE NODE

(71) Applicant: APPLE INC., Cupertino, CA (US)

(72) Inventor: Changhong Shan, Shanghai (CN)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 15/767,562

(22) PCT Filed: Aug. 30, 2016

(86) PCT No.: PCT/US2016/049380
§ 371 (c)(1),
(2) Date: Apr. 11, 2018

(87) PCT Pub. No.: WO2017/078837
PCT Pub. Date: May 11, 2017

(65) Prior Publication Data
US 2018/0302857 A1    Oct. 18, 2018

(30) Foreign Application Priority Data
Nov. 6, 2015 (WO) ............... PCT/CN2015/094005

(51) Int. Cl.
  *H04W 4/00*      (2018.01)
  *H04W 52/02*     (2009.01)
  (Continued)

(52) U.S. Cl.
  CPC ..... *H04W 52/0229* (2013.01); *H04W 68/005* (2013.01); *H04W 76/22* (2018.02);
  (Continued)

(58) Field of Classification Search
  CPC ..... H04W 52/02; H04W 68/00; H04W 76/27; H04W 88/16; H04W 76/22
  See application file for complete search history.

(56) References Cited

U.S. PATENT DOCUMENTS 5,646,562 A    7/1997   Abe
8,515,465 B2   8/2013   Olsson et al.
(Continued)

FOREIGN PATENT DOCUMENTS

EP    2474191 A2     7/2012
WO    2015/000516 A1  1/2015

OTHER PUBLICATIONS

3GPP TR 23.709 V1.1.1 (Feb. 2015).*
(Continued)

*Primary Examiner* — Abdelillah Elmejjarmi
(74) *Attorney, Agent, or Firm* — Eschweiler & Potashnik, LLC

(57) ABSTRACT

An apparatus for use in a serving gateway user plane (SGW-U) of an evolved packet core (EPC) of a wireless communication network is disclosed. The apparatus comprises one or more processors configured to process a downlink (DL) data signal comprising a DL data packet for a user equipment (UE) in the network, buffer the DL data packet in the DL data signal and identify a serving gateway control plane (SGW-C) associated with the SGW-U that serves the UE, when the UE is in idle mode. The one or more processors is further configured to provide an SGW-U DL data notification message to the SGW-C, generated selectively based on a priority of the received DL data signal, in order to inform the SGW-C about the availability of DL data for the UE.

19 Claims, 9 Drawing Sheets

(51) Int. Cl.
*H04W 76/22* (2018.01)
*H04W 76/27* (2018.01)
*H04W 68/00* (2009.01)
*H04W 88/16* (2009.01)

(52) U.S. Cl.
CPC ........... *H04W 76/27* (2018.02); *H04W 88/16* (2013.01); *Y02D 30/70* (2020.08)

(56) References Cited

U.S. PATENT DOCUMENTS

| | | | |
|---|---|---|---|
| 2011/0286465 A1* | 11/2011 | Koodli | H04W 68/00 370/401 |
| 2011/0310804 A1 | 12/2011 | Beygzadeh | |
| 2015/0110121 A1* | 4/2015 | Tan | H04L 45/74 370/401 |
| 2015/0365158 A1* | 12/2015 | Kindler | H04B 1/40 370/315 |
| 2016/0112945 A1* | 4/2016 | Chen | H04W 76/10 370/338 |
| 2016/0219605 A1* | 7/2016 | Karlsson | H04W 72/10 |
| 2016/0323845 A1 | 11/2016 | Kim | |
| 2018/0192394 A1* | 7/2018 | Jin | H04W 68/02 |
| 2018/0288735 A1* | 10/2018 | Walldeen | H04W 4/70 |
| 2018/0317201 A1* | 11/2018 | Cha | H04W 72/1242 |

OTHER PUBLICATIONS

3GPP TR 23.709 VI.1.1 (Feb. 2015).*
International Search Report dated Nov. 25, 2016 for International Application PCT/US2016/049380.
"3rd Generation Partnership Project;Technical Specification Group Services and System Aspects; General Packet Radio Service (GPRS) enhancements for Evolved Universal Terrestrial Radio Access Network (E-UTRAN) access (Release 11)." 3GPP TS 23.401 V11.4.0 (Dec. 2012). 3GPP Lte Advanced. 284 pages.
"3rd Generation Partnership Project;Technical Specification Group Services and System Aspects; General Packet Radio Service (GPRS) enhancements for Evolved Universal Terrestrial Radio Access Network (E-UTRAN) access (Release 10)." 3GPP TS 23.401 V10.4.0. (Jun. 2011), 281 pages.
Said, Siwar Ben Hadj et al. "New Control Plane in 3GPP LTE/EPC Architecture for On-Demand Connectivity Service," 5 pages.
Wale, Karl et al, "implementing ATCA Serving Gateways for LTE Networks." Radisys White Paper, Feb. 2010. 7 pages.
"Flexible and Elastic User-data Plane with OpenFlow v1.4.0." CP/UP Split with OpenFlow—OpenEPC. 2 pages.
International Patent Application PCT/US2016/024644 filed on Mar. 29, 2016.
Translation of Chinese Search Report in connection with Chinese Patent Application 2016800620849.

* cited by examiner

DOWNLINK DATA HANDLING FOR IDLE MODE UE WHEN THE SGW IS SPLIT INTO CONTROL PLANE NODE AND USER PLANE NODE

REFERENCE TO RELATED APPLICATIONS

This application is a National Phase entry application of International Patent Application No. PCT/US2016/049380 filed Aug. 30, 2016, which claims priority to International Patent Application PCT/CN2015/094005 filed on Nov. 6, 2015, entitled "DOWNLINK DATA HANDLING FOR IDLE MODE UE WHEN THE SGW IS SPLIT INTO CONTROL PLANE NODE AND USER PLANE NODE" in the name of Changhong Shan and is hereby incorporated by reference in its entirety.

FIELD

The present disclosure relates to the field of wireless communications, and more specifically to a method and an apparatus for handling downlink (DL) data for an idle mode user equipment (UE) in wireless communication networks.

BACKGROUND

In recent years, demand for access to fast mobile wireless data for mobile electronic devices has fueled the development of the 3rd Generation Partnership Project (3GPP) long term evolution (LTE) communication system (hereinafter "LTE system"). In LTE systems, serving gateway (SGW) is the gateway which terminates the interface towards E-UTARN. SGW is responsible for handovers with neighboring eNodeBs, also for data transfer in terms of all packets across user plane. For idle state UEs, the SGW terminates the downlink (DL) data path and triggers paging when downlink data arrives for the UE.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
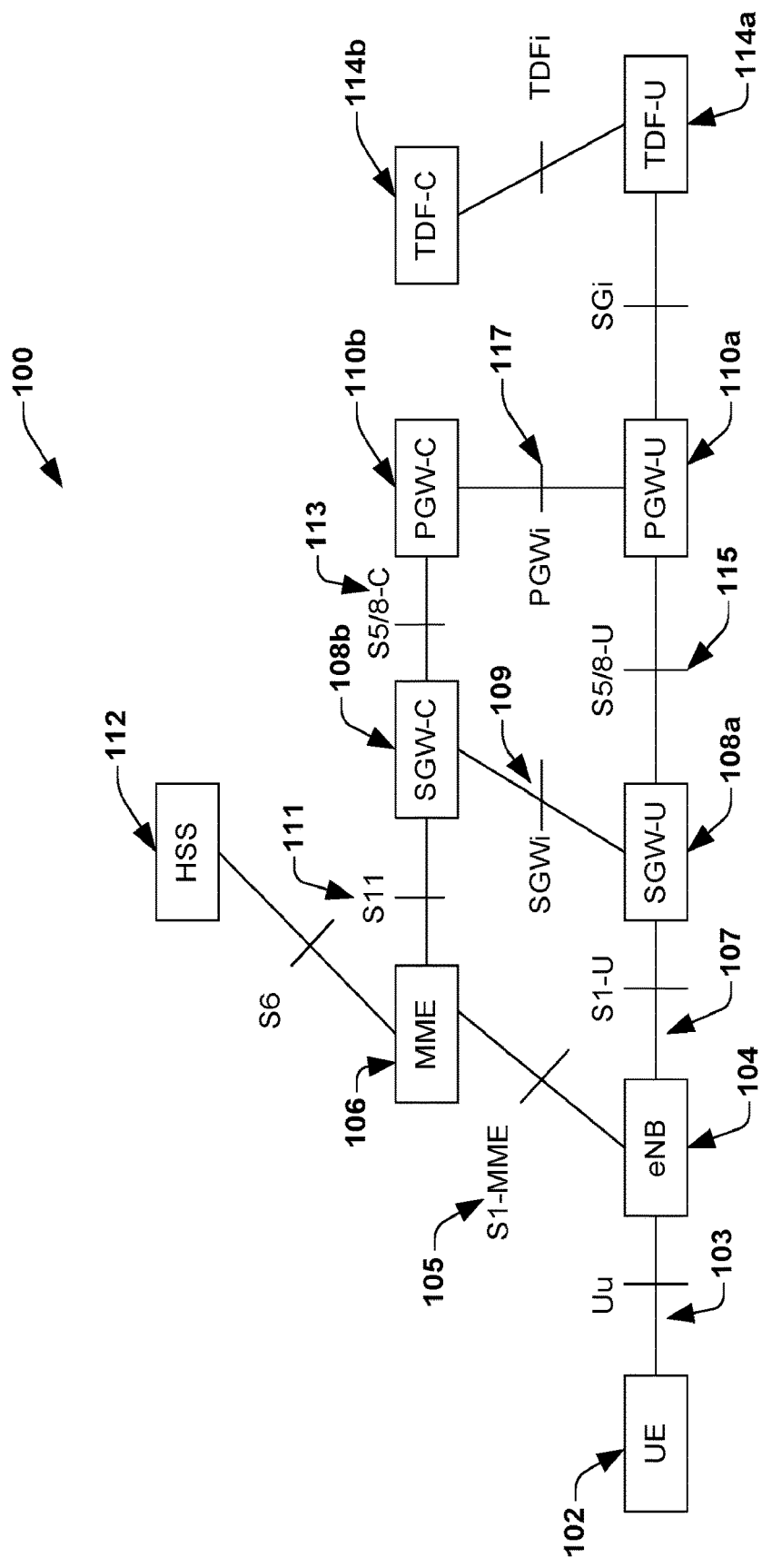
FIG. 1 illustrates an architecture of a wireless communication network, according to one embodiment of the disclosure.

In one embodiment of the disclosure, an apparatus for use in a serving gateway user plane (SGW-U) of an evolved packet core (EPC) of a wireless communication network is disclosed. The apparatus comprises a processing circuit configured to process a downlink (DL) data signal comprising a DL data packet for a user equipment (UE) in the network; and identify a serving gateway control plane (SGW-C) associated with the SGW-U that serves the UE, when the UE is in idle mode. The apparatus further comprises a memory circuit configured to buffer the DL data packet in the DL data signal, when the UE is in the idle mode.

In one embodiment of the disclosure, an apparatus for use in a serving gateway control plane (SGW-C) of a wireless communication network is disclosed. The apparatus comprises a processing circuit configured to process an SGW-U downlink (DL) data notification message received from a serving gateway user plane (SGW-U) associated therewith, wherein the SGW-U DL data notification message indicates an availability of a DL data for an idle mode user equipment (UE) served by the SGW-C. The processing circuit is further configured to provide a SGW-C DL data notification acknowledge message to the SGW-U, in response to the SGW-U DL data notification message, wherein the SGW-C DL data notification acknowledge message comprises a status information associated with the SGW-U DL data notification message.

In one embodiment of the disclosure, an apparatus for use in a mobility management entity (MME) of a wireless communication network is disclosed. The apparatus comprises a processing circuit configured to process a first SGW-C downlink (DL) data notification message received from a serving gateway control plane (SGW-C) associated therewith, wherein the first SGW-C DL data notification message indicates an availability of a DL data for an idle mode user equipment (UE) served by the MME. The processing circuit is further configured to provide an MME DL data notification acknowledge message to the SGW-C, in response to the first SGW-C DL data notification message, wherein the MME DL data notification acknowledge message comprises a status information associated with the first SGW-C DL data notification message.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As indicated above, in LTE systems, the serving gateway (SGW) terminates the downlink (DL) data path and triggers paging when downlink data arrives for a UE in idle state. In current SGW implementations, the control plane and the user plane are tightly coupled together. When SGW receives a data packet for a UE that is not user plane connected (i.e., in idle mode), dedicated bearers for the UE has to be established, in order to forward the data packet to the UE. For UEs in idle mode, the SGW handles DL data as defined in section 5.3.4.3 of technical specification (TS) 23.401. However, in some embodiments, the SGW may be split into a user plane node, SGW-U and a control plane node, SGW-C, respectively.

Various embodiments described herein facilitates handling of downlink data at SGW-U and SGW-C when the downlink data arrives at SGW-U for a UE in idle mode. In one embodiment, an apparatus and a method that facilitates handling of DL data at the SGW-U is disclosed. In another embodiment, an apparatus and a method that facilitates handling of DL data at the SGW-C is disclosed. In yet another embodiment, an apparatus and a method that facilitates handling of DL data at a mobility management entity (MME) is disclosed.

FIG. 1 illustrates an architecture of a wireless communication network 100, according to one embodiment of the disclosure. In some embodiments, the wireless communication network 100 facilitates handling control and data traffic to and from user equipments (UEs) in the network. The wireless communication network 100 comprises a UE 102, an eNodeB 104 and a mobility managing node, for example, mobility management entity (MME) 106. The network 100 further comprises a serving gateway user plane (SGW-U) 108a, a serving gateway control plane (SGW-C) 108b, a packet data network gateway user plane (PGW-U) 110a and a packet data network gateway control plane (PGW-C) 110b. Furthermore, the network 100 comprises a home subscriber server (HSS) 112, a traffic detection function user plane (TDF-U) 114a and a traffic detection function control plane (TDF-C) 114b. In some embodiments, the network 100 further comprises an additional mobility managing node, for example, serving GPRS support node (SGSN) (not shown) associated with the network.

In some embodiments, the MME 106, the SGW-U 108a, the SGW-C 108b, the PGW-U 110a, the PGW-C 110b and HSS 112 forms an evolved packet core (EPC) and is referred to as a core network. In some embodiments, the UE 102 is coupled to the eNodeB 104 over a Uu interface 103 and the eNodeB 104 is coupled to the MME 106 over a S1-MME interface 105. Further, the network 100 comprises a S1-U interface 107 between the eNodeB 104 and the SGW-U 108a, an S11 interface between the MME 106 and the SGW-C 108b, and an SGWi interface 109 between the SGW-U and SGW-C. In addition, the network 100 comprises interfaces S5/8-C 113 and S5/8-C 113 between SGW-C 108b and PGW-C 110b, and SGW-U 108a and PGW-U 110a, respectively. Furthermore, the network 100 comprises a PGWi interface 117 between the PGW-U 110a and the PGW-C 110b. In some embodiments, the SGW-C 108b and PGW-C 110b may be collocated in the cloud. In such embodiments, the S5/8-C interface 113 may not be included, and signaling interaction between SGW-C 108b and PGW-C 110b may not be required. Further, in some embodiments, SGW-U 108a and PGW-U 110a also may be collocated, thus S5/8-U 115 may not be included, and SGWi 109 and PGWi 117 may be combined into one interface. In some embodiments, the SGSN (not shown) is coupled to the MME via an S3 interface (not shown) and the SGSN is coupled to the SGW-C via an S4 interface (not shown).

In some embodiments, when the SGW-U 108a receives data packets (i.e., downlink data) for a UE (e.g., UE 102) in the network that is not user plane connected (i.e., UE in idle mode), dedicated bearers have to be established for the UE in order to forward the downlink (DL) data to the UE. In such embodiments, the SGW-U 108a may buffer the data packets and send the data packets to the UE only when the dedicated bearers for the UE are established in the network. The signal flow that enables the SGW-U 108*a* to handle the DL data is described in greater detail below.

Figure 2:
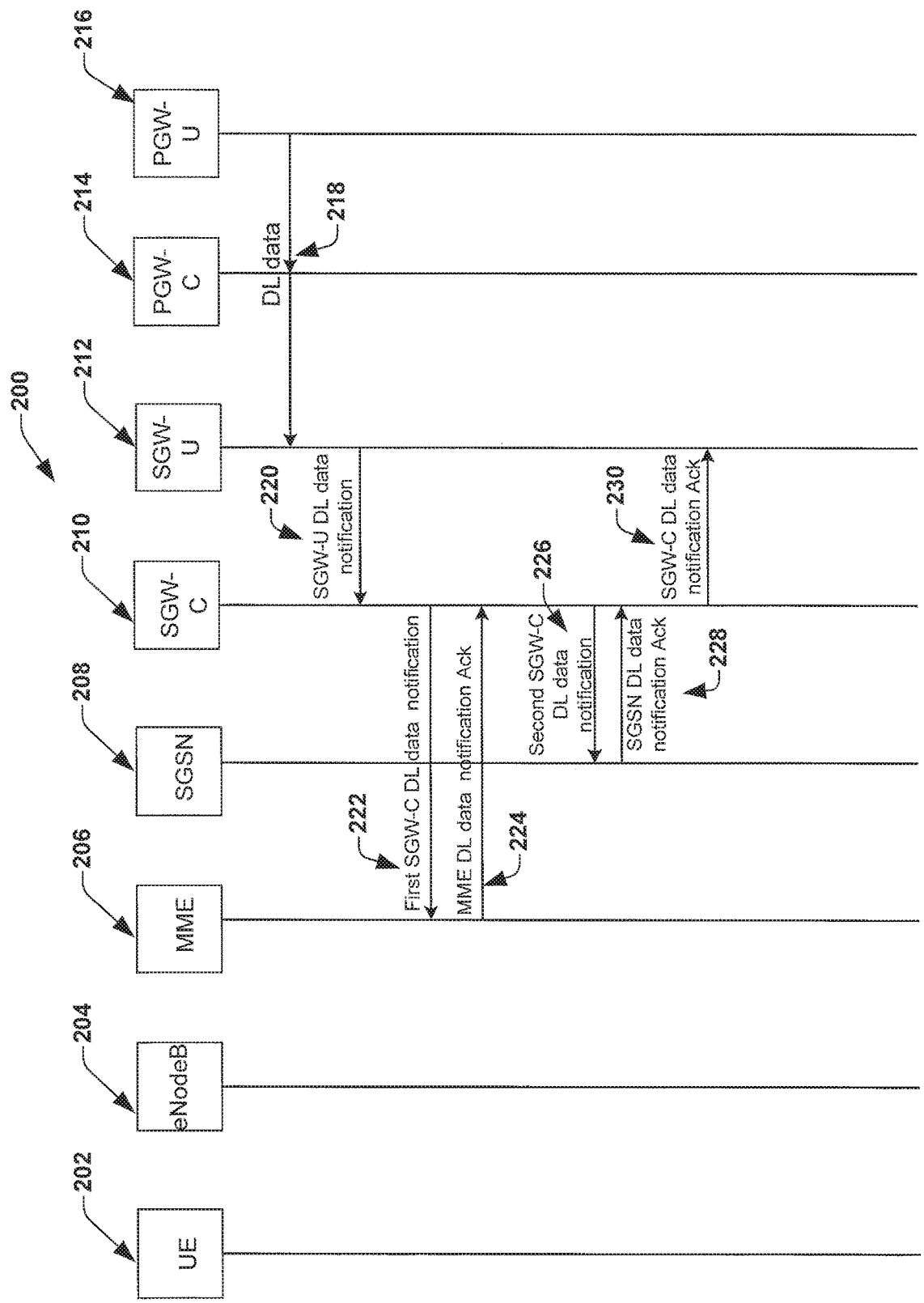
FIG. 2 illustrates a signal flow that enables a wireless communication network to handle downlink (DL) data for a UE in idle mode in the network, according to one embodiment of the disclosure.

FIG. 2 illustrates a signal flow that enables a wireless communication network 200 to handle downlink (DL) data for a UE in idle mode in the network, according to one embodiment of the disclosure. In this embodiment, the serving gateway (SGW) of the network 200 is split into SGW-U and SGW-C. In some embodiments, the wireless communication network 200 in FIG. 2 is similar to the wireless communication network 100 in FIG. 1. The wireless communication network 200 comprises a UE 202, an eNodeB 204, and MME 206 and/or a SGSN 208. Further, the network 200 comprises a SGW-C 210, a SGW-U 212, a PGW-C 214 and a PGW-U 216. In some embodiments, the signal flow described below comprises a network triggered service request procedure.

The SGW-U 212 initiates the DL data transfer to the UE 202, when the SGW-U 212 has DL data available for the UE 212. In some embodiments, the DL data is received at the SGW-U via a DL data signal 218 comprising a DL data packet from the PGW-U 216 in the network 200. In some embodiments, if the UE 212 is in idle mode or is not user plane connected (i.e., the SGW-U context data indicates no downlink user plane tunnel endpoint identifier (DL-TEID)), dedicated bearers have to be established for the UE 212, in order to forward the data packet to the UE 212. In such embodiments, the SGW-U 212 is configured to buffer the data packets, prior to forwarding the data packets to the UE 202. Further, the SGW-U 212 is configured to identify a SGW-C, for example, the SGW-C 210 associated with the SGW-U 212 that serves the UE 202, in order to establish dedicated bearers for the UE 202 in the network.

Upon identifying the SGW-C 210 that serves the UE 202, the SGW-U 212 is configured to selectively generate a SGW-U DL data notification message 220 and provide the generated SGW-U DL data notification message 220 to the SGW-C 210, based on a priority of the received DL data packet. For example, in some embodiments, if the MME 206 and the SGW-C 210 have requested the SGW-U 212 to throttle downlink low priority traffic (for example, during an initial attach procedure), and if the DL data packet is received on a low priority bearer to be throttled, the SGW-U 212 may drop the downlink data packet. In such embodiments, the SGW-U 212 may not generate the SGW-U DL data notification message 220. In some embodiments, the SGW-U DL data notification message 220 indicates the availability of DL data for the UE 202. In some embodiments, the SGW-U DL data notification message 220 comprises information on allocation and retention priority (ARP) and EPS bearer ID associated with a bearer on which the DL data packet is received. When supporting paging policy differentiation, the SGW-U 212 may indicate in the SGW-U DL data notification message 220, a paging policy indication that is related to the downlink data that triggered the SGW-U DL data notification message 220, as discussed in clause 4.9 of technical specification (TS) 23.401.

In some embodiments, if the MME 206 and the SGW-C 210 have requested the SGW-U 212 to delay sending the downlink data notification (as discussed in 3GPP TS 23.401, sec. 5.3.4.2 on "Handling of abnormal conditions in UE triggered Service Request"), the SGW-U 212 may buffer the downlink data and wait until a timer expires before sending the SGW-U DL data notification message 220. In some embodiments, the delay introduced by the timer corresponds to a delay provided by the MME 206 and the SGW-C 210. If however, the DL-TEID and eNodeB address for UE 202 is received at the SGW-U 212 before the expiry of the timer, the timer may be cancelled and the network triggered service request procedure may be completed by sending the DL data from the SGW-C 212 to the UE 202. Further, if the SGW-U 212 receives additional DL data packets for the UE 202, before the expiry of the timer, the SGW-U does not restart the timer.

Upon receiving the SGW-U DL data notification message 220, the SGW-C 210 is configured to generate a first SGW-C DL data notification message 222 and provide the generated first SGW-C DL data notification message 222 to an MME, for example, the MME 206 serving the UE 202. In some embodiments, the SGW-C 210 is further configured to generate a second SGW-C DL data notification message 226 and provide the generated second SGW-C DL data notification message 226 to the SGSN 208. In some embodiments, the first SGW-C DL data notification message 222 and the second SGW-C DL data notification message 226 generated at the SGW-C 210 indicates the availability of DL data for the UE 202. In some embodiments, the first SGW-C DL data notification message 222 and the second SGW-C DL data notification message 226 comprises information on allocation and retention priority (ARP) and EPS bearer ID associated with a bearer on which the DL data packet is received. When supporting paging policy differentiation, the SGW-C 210 may indicate in the first SGW-C DL data notification message 222 and in the second SGW-C DL data notification message 226, a paging policy indication that is related to the downlink data that triggered first SGW-C DL data notification message 222 and the second SGW-C DL data notification message 226, respectively, as discussed in clause 4.9 of TS 23.401.

The MME 206 is configured to generate an MME DL data notification acknowledge (Ack) message 224, in response to receiving the first SGW-C DL data notification message 222 from the SGW-C 210 and provide the generated MME DL data notification acknowledge (Ack) message 224 to the SGW-C 210. In some embodiments, the MME DL data notification ack message 224 comprises a status information associated with the first SGW-C DL data notification message 222. Upon receiving the MME DL data notification ack message 224, the SGW-C 210 is configured to generate an SGW-C DL data notification ack message 230, based on the received MME DL data notification ack message 224. In some embodiments, the SGW-C DL data notification ack message 230 comprises a status information associated with the SGW-U DL data notification message 220.

The SGSN 208 is configured to generate an SGSN DL data notification acknowledge (Ack) message 228, in response to receiving the second SGW-C DL data notification message 226 from the SGW-C 210 and provide the generated SGSN DL data notification acknowledge (Ack) message 228 to the SGW-C 210. In some embodiments, the SGSN DL data notification ack message 228 comprises a status information associated with the second SGW-C DL data notification message 226. Upon receiving the SGSN DL data notification ack message 224, the SGW-C 210 is configured to generate the SGW-C DL data notification ack message 230, based on the received SGSN DL data notification ack message 228. In some embodiments, the SGW-C DL data notification ack message 230 comprises a status information associated with the SGW-U DL data notification message 220.

In some embodiments, if the MME 206 and the SGSN 208 identifies that the UE 202 is in a power saving state (i.e., a power saving mode) and cannot be reached by paging at the moment, the MME 206 and SGSN 208 is configured to invoke extended buffering, depending on operator configuration. In such embodiments, the MME 206/SGSN 208 is configured to derive a DL buffering duration time based on an expected time to establish radio bearers to the UE 202. The MME 206/SGSN 208 stores a value for the DL buffering duration time in the context for the UE. The DL buffering duration time is used for UEs, for example, UE 202, using power saving state and indicates that there are buffered data in the SGW-U 212 and that the user plane setup procedure is needed when the UE 202 makes signaling with the network. When the DL buffering duration time has expired, the MME 206/SGSN 208 considers no DL data to be buffered and no indications of buffered DL data are sent during context transfers at TAU procedures.

In such embodiments, the MME DL data notification ack message 224 and the SGSN DL data notification ack message 228 to the SGW-C 210 comprises a DL buffering requested indication comprising the derived DL buffering duration time as indicated above. Further, the SGW-C DL data notification ack message 230 comprises the DL buffering requested indication comprising the derived DL buffering duration time. Upon receiving the DL buffering requested indication in the SGW-C DL data notification ack message 230, the SGW-U 212 is configured to store the received DL buffering duration time and not send any additional DL data notification messages, if subsequent downlink data packets are received at the SGW-U 212 before the DL buffering duration time has expired for the UE 202.

In some embodiments, if the SGW-U 212, while waiting for the user plane to be established, is triggered to send a second, different SGW-U DL data notification message for a bearer with higher priority (i.e. ARP priority level) than the first SGW-U DL data notification message (e.g., the SGW-U DL data notification message 220) was sent for, the SGW-U 212 sends a new SGW-U DL data notification message indicating the higher priority to the SGW-C 210. If the SGW-U 212 receives additional downlink data packets for a bearer with same or lower priority than the first DL data notification message (e.g., the SGW-U DL data notification message 220) was sent for or if the SGW-U 212 has sent the second DL data notification message indicating the higher priority and receives additional downlink data packets for the UE 202, the SGW-U 212 buffers these downlink data packets and does not send a new SGW-U DL data notification message.

In some embodiments, if a tracking area update (TAU) procedure with the MME 206 change or a routing area update (RAU) procedure is in progress when the MME 206 receives a first SGW-C DL data notification message (e.g., the first SGW-C DL data notification message 222) from the SGW-C 210, the MME 206 may reject the first SGW-C DL data notification message with an indication that the first SGW-C DL data notification message has been temporarily rejected. In such embodiments, the MME DL data notification ack message 224 to the SGW-C 210 comprises an indication that the first SGW-C DL data notification message 222 has been temporarily rejected. The rejection of the first SGW-C DL data notification message 222, in some embodiments, corresponds to a rejection of the SGW-U DL data notification message 220 from the SGW-U 212. Therefore, in such embodiments, the SGW-C DL data notification ack message 230 to the SGW-U 212 comprises an indication that the SGW-U DL data notification message 220 has been temporarily rejected.

Similarly, if the routing area update (RAU) procedure with SGSN 208 change or the TAU procedure is in progress when the SGSN (e.g., the SGSN 208) receives a DL data notification message (e.g., the second SGW-C DL data notification message 226), the SGSN (i.e., the SGSN 208) may reject the second SGW-C DL data notification message with an indication that the second SGW-C DL data notification message has been temporarily rejected. In such embodiments, the SGSN DL data notification ack message 228 to the SGW-C 210 comprises an indication that the second SGW-C DL data notification message 226 has been temporarily rejected. The rejection of the second SGW-C DL data notification message 226, in some embodiments, corresponds to a rejection of the SGW-U DL data notification message 220 from the SGW-U 212. Therefore, in such embodiments, the SGW-C DL data notification ack message 230 to the SGW-U 212 comprises an indication that the SGW-U DL data notification message 220 has been temporarily rejected.

Upon receiving the indication that the SGW-U DL data notification message 220 has been temporarily rejected, in some embodiments, the SGW-U 212 may start a locally configured guard timer and buffers all downlink user packets received for the UE 202 and waits for a modify bearer request message to come from an MME or SGSN associated therewith. Upon reception of a modify bearer request message, the SGW-U 212 may resend the SGW-U DL data notification message 220 to the SGW-C 210, and the SGW-C 210 may re-send the first SGW-C DL data notification message 222 or the second SGW-C DL data notification message 226, respectively, only to the new MME or the new SGSN from which the SGW-C 210 received the modify bearer request message. In the embodiments where the SGW-U 212 or the SGW-C 210 does not receive a modify bearer request message from an MME or a SGSN, the SGW-U 212 releases the buffered downlink user packets at an expiry of the guard timer or receiving a delete session request message from the MME or the SGSN.

Figure 3:
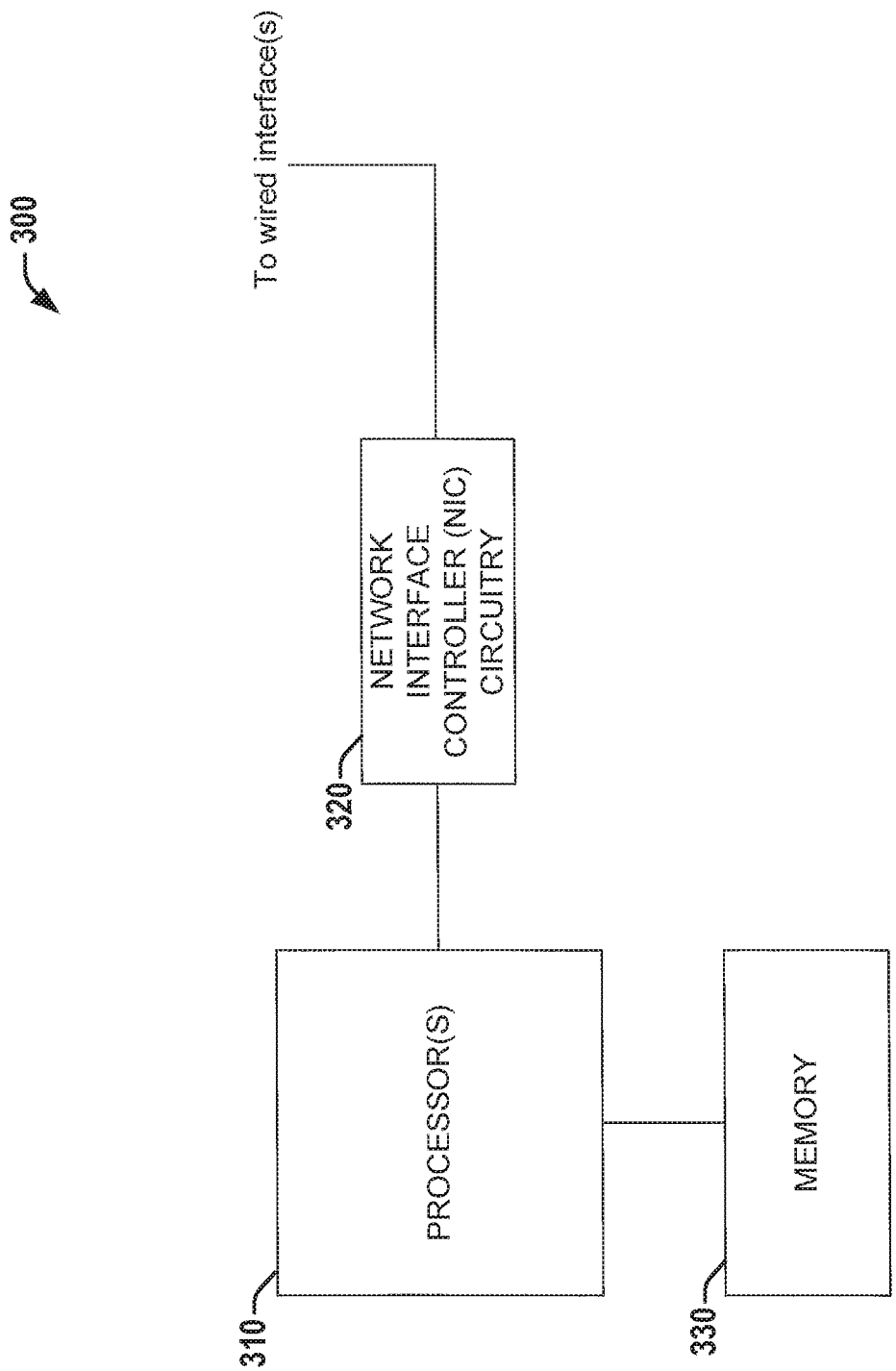
FIG. 3 illustrates a block diagram of an apparatus for use in a serving gateway user plane (SGW-U) of a wireless communication network, that facilitates handling downlink (DL) data for an idle mode user equipment (UE) in the network, according to the various embodiments described herein.

FIG. 3 illustrates a block diagram of an apparatus 300 for use in a serving gateway user plane (SGW-U) of a wireless communication network, that facilitates handling downlink (DL) data for an idle mode user equipment (UE) in the network, according to the various embodiments described herein. The apparatus 300 is explained herein with reference to the SGW-U 212 in FIG. 2. The apparatus 300 includes a processing circuitry 310 coupled with an interface circuitry 320. In some embodiments, the apparatus 300 further comprises a memory circuit 330 configured to store instructions and data associated with the SGW-U. In some embodiments, the processing circuitry 310 can comprise one or more processors. In some embodiments, various functions of the processing circuity 310 are performed using different processors. However, in other embodiments, various functions of the processing circuitry 310 can be performed in a single processor. In some embodiments, the memory circuit 330 can be a single memory or a plurality of memories. In some embodiments, the plurality of memories can be in a single location, e.g., a semiconductor chip, or in other embodiments, the plurality of memories can be in different locations. As used herein, the term "circuitry" or "circuit" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The interface circuitry 320 may be configured to communicate with other network entities over various interfaces using appropriate networking communication protocols. The interface circuitry 320 may be capable of communicating over any number of wired or wireless communication interfaces. In some embodiments, the interface circuitry 320 may communicate over Ethernet or other computer networking technologies using a variety of physical media interfaces such as, but not limited to, coaxial, twisted-pair compare, and fiber-optics media interfaces. The processing circuitry 310 may be configured to provide higher-layer operations that include generating and processing signals transmitted and received by the interface circuitry 320.

In some embodiments, the apparatus 300 can be included within the SGW-U 212 in FIG. 2. When downlink (DL) data is available for UE in the network, the apparatus 300 within the SGW-U 212 receives the DL data from a PDN gateway (e.g., the PGW-U 216) associated therewith. In such embodiments, the processing circuitry 310 within the apparatus 300 is configured to receive a DL data signal (e.g., the DL data signal 218) comprising a DL data packet via the interface circuitry 320. The processing circuitry 310 is further configured to process the DL data signal and identify the UE (e.g., the UE 202) to which the DL data is to be send. If the UE (e.g., the UE 202) is in idle mode, the processing circuitry 310 is configured to buffer the DL data packet and store the DL data packet in the memory circuit 330.

Further, the processing circuit 310 is configured to identify an SGW-C (e.g., the SGW-C 210) serving the UE (e.g., the UE 202). In addition, the processing circuitry 310 is configured to provide an SGW-U DL data notification message (e.g., the SGW-U DL data notification message 220), selectively generated based on a priority of the received DL data signal at the processing circuit 310, to the SGW-C (e.g., the SGW-C 210). For example, in some embodiments, the processing circuitry 310 is configured to drop the DL data packet and not provide the SGW-U DL data notification message to the SGW-C, when the DL data packet is received on a low priority bearer, based on a request from the SGW-C (e.g., the SGW-C 210) or a mobility management entity (MME) (e.g., MME 206) associated therewith. In some embodiments, the generated SGW-U DL data notification message is provided to the SGW-C, via the interface circuitry 320, in order to inform the SGW-C about the availability of DL data for the UE.

In some embodiments, the processing circuitry 301 is further configured to introduce a predetermined delay prior to providing the SGW-U DL data notification message to the SGW-C, based on a request from the SGW-C (e.g., the SGW-C 210) or a mobility management entity (MME) (e.g., MME 206) associated therewith to delay sending the SGW-U DL data notification message to the SGW-C. In some embodiments, the predetermined delay is provided by the MME or the SGW-C and is stored in the memory circuit 330.

In some embodiments, the processing circuitry 320 is further configured to process an SGW-C DL data notification ack message (e.g., the SGW-C DL data notification ack message 230) received from the SGW-C (e.g., the SGW-C 210), via the interface circuitry 320, in response to sending the SGW-U DL data notification message to the SGW-C. In some embodiments, the SGW-C DL data notification acknowledge message received from the SGW-C comprises a status information associated with the SGW-U DL data notification message. In some embodiments, the SGW-C DL data notification acknowledge message (e.g., the SGW-C DL data notification ack message 230) received from the SGW-C comprises a DL buffering requested indication comprising a DL buffering duration time that indicates a time required to establish radio bearers of the UE, in order to send the DL data to the UE. In some embodiments, the DL buffering duration time is stored in the memory circuit 330. In such embodiments, the processing circuitry 310 is configured to introduce a delay corresponding to the DL buffering duration time prior to providing a subsequent SGW-U DL data notification message to the SGW-C, when subsequent data packets are received at the SGW-U before the expiration of the DL buffering duration time.

In some embodiments, the SGW-C DL data notification acknowledge message (e.g., the SGW-C DL data notification ack message 230) received from the SGW-C at the processing circuit 310 comprises an indication that the SGW-U DL data notification message (e.g., the SGW-U DL data notification message 220) provided to the SGW-C is temporarily rejected by a mobility management entity MME or a service GPRS support node (SGSN) associated therewith. In such embodiments, the processing circuitry 310 is configured to start a locally configured guard timer having a predetermined delay associated therewith, and buffer subsequent DL data packets in the memory circuit 330, until a modify bearer request message is received from an MME or an SGSN associated therewith, or the guard timer is expired. The processing circuitry 310, upon receiving the modify bearer request message, is configured to provide the SGW-U DL data notification message again to the SGW-C, for subsequent transmission to the MME or the SGSN from which the modify bearer request message is received. In some embodiments, the processing circuitry 310 is further is configured to release the buffered DL data packets, if the guard timer is expired or a delete session request message is received from an MME or a SGSN associated therewith, before receiving the modify bearer request message.

Figure 4:
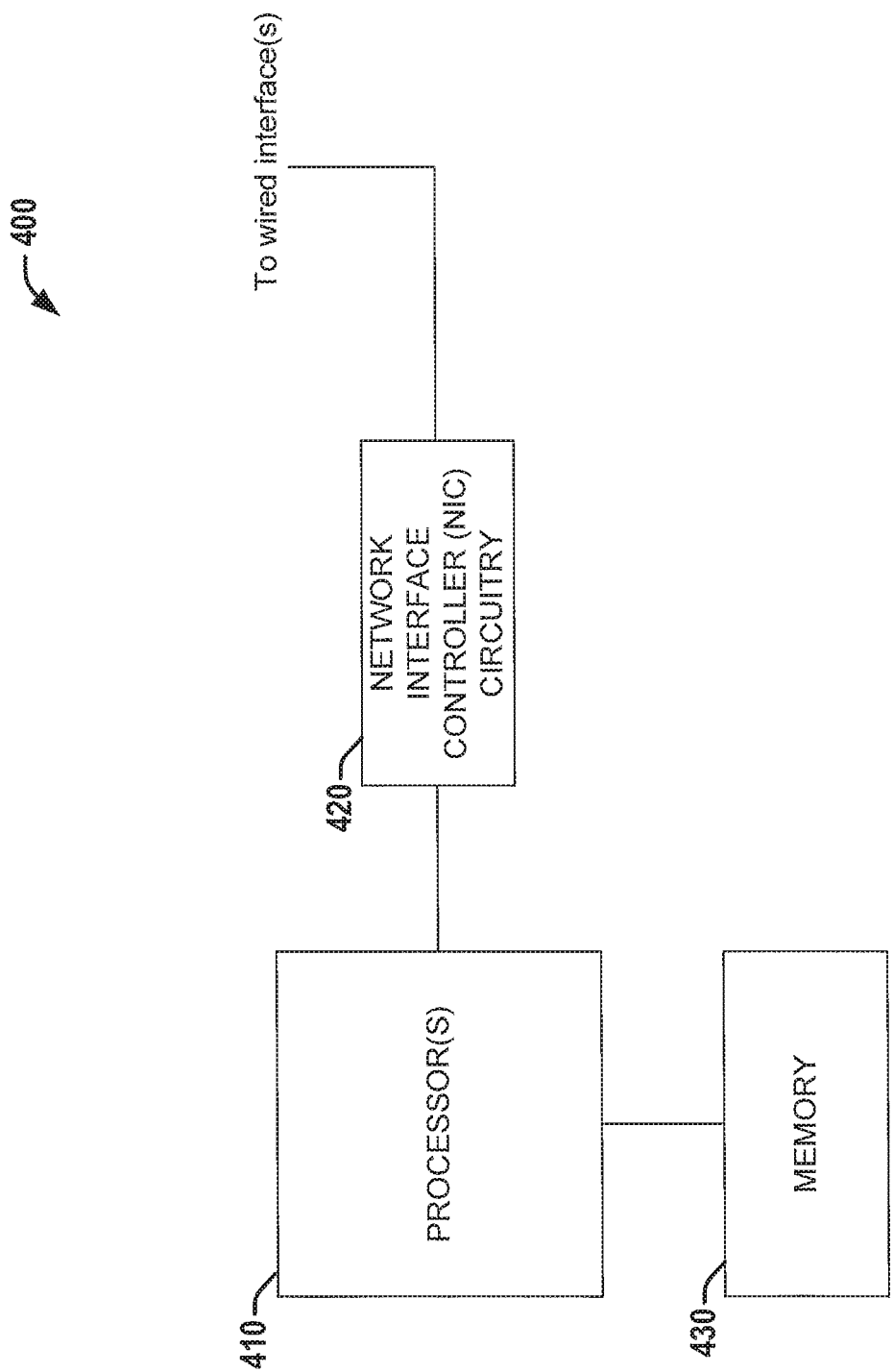
FIG. 4 illustrates a block diagram of an apparatus for use in a serving gateway control plane (SGW-C) of a wireless communication network, that facilitates handling downlink (DL) data for an idle mode user equipment (UE) in the network, according to the various embodiments described herein.

FIG. 4 illustrates a block diagram of an apparatus 400 for use in a serving gateway control plane (SGW-C) of a wireless communication network, that facilitates handling downlink (DL) data for an idle mode user equipment (UE) in the network, according to the various embodiments described herein. The apparatus 400 is explained herein with reference to the SGW-C 210 in FIG. 2. The apparatus 400 includes a processing circuitry 410 coupled with an interface circuitry 420. In some embodiments, the apparatus 400 further comprises a memory circuit 430 configured to store instructions and data associated with the SGW-C. In some embodiments, the processing circuitry 410 can comprise one or more processors. In some embodiments, various functions of the processing circuity 410 are performed using different processors. However, in other embodiments, various functions of the processing circuitry 410 can be performed in a single processor. In some embodiments, the memory circuit 430 can be a single memory or a plurality of memories. In some embodiments, the plurality of memories can be in a single location, e.g., a semiconductor chip, or in other embodiments, the plurality of memories can be in different locations. As used herein, the term "circuitry" or "circuit" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The interface circuitry 420 may be configured to communicate with other network entities over various interfaces using appropriate networking communication protocols. The interface circuitry 420 may be capable of communicating over any number of wired or wireless communication interfaces. In some embodiments, the interface circuitry 420 may communicate over Ethernet or other computer networking technologies using a variety of physical media interfaces such as, but not limited to, coaxial, twisted-pair compare, and fiber-optics media interfaces. The processing circuitry 410 may be configured to provide higher-layer operations that include generating and processing signals transmitted and received by the interface circuitry 420.

In some embodiments, the apparatus 400 can be included within the SGW-C 210 in FIG. 2. When downlink (DL) data is available for a UE in the network, the apparatus 400 receives the DL data from a SGW-U (e.g., the SGW-U 212) associated therewith. In such embodiments, the processing circuitry 410 is configured to receive an SGW-U DL data notification message (e.g., the SGW-U DL data notification message 220) via the interface circuitry 420, from an SGW-U (e.g., the SGW-U 212) associated therewith. In some embodiments, the SGW-U DL data notification message indicates an availability of a DL data for a user equipment (UE) served by the SGW-C. Upon receiving the SGW-U DL data notification message, the processing circuitry 410 is configured to generate a first SGW-C DL data notification message (e.g., the first SGW-C DL data notification message 222) for subsequent transmission to an MME (e.g., the MME 206) associated therewith, via the interface circuitry 420. In some embodiments, the processing circuitry 410 is further configured to receive an MME DL data notification ack message (e.g., the MME DL data notification ack message 224) from the MME via the interface circuitry 420, in response to the first SGW-C DL data notification message. In some embodiments, the MME DL data notification ack message provides a status information associated with the first SGW-C DL data notification message.

In some embodiments, the processing circuitry 410 is further configured to generate a second SGW-C DL data notification message (e.g., the second SGW-C DL data notification message 226) for subsequent transmission to a SGSN (e.g., the SGSN 208) associated therewith, via the interface circuitry 420, upon receiving the SGW-U DL data notification message from the SGW-U. In such embodiments, the processing circuitry 410 is further configured to receive a SGSN DL data notification ack message (e.g., the SGSN DL data notification ack message 228) from the SGSN via the interface circuitry 420, in response to the second SGW-C DL data notification message. In some embodiments, the SGSN DL data notification ack message provides a status information associated with the second SGW-C DL data notification message.

Upon receiving the MME DL data notification ack message or the SGSN DL data notification ack message, the processing circuitry 410 is configured to generate an SGW-C DL data notification ack message (e.g., the SGW-C DL data notification ack message 230) for subsequent transmission to the SGW-U (e.g., the SGW-U 212), via the interface circuitry 420. The SGW-C DL data notification ack message is generated based on the received MME DL data notification ack message or the SGSN DL data notification ack message, and comprises a status information associated with the SGW-U DL data notification message.

Figure 5:
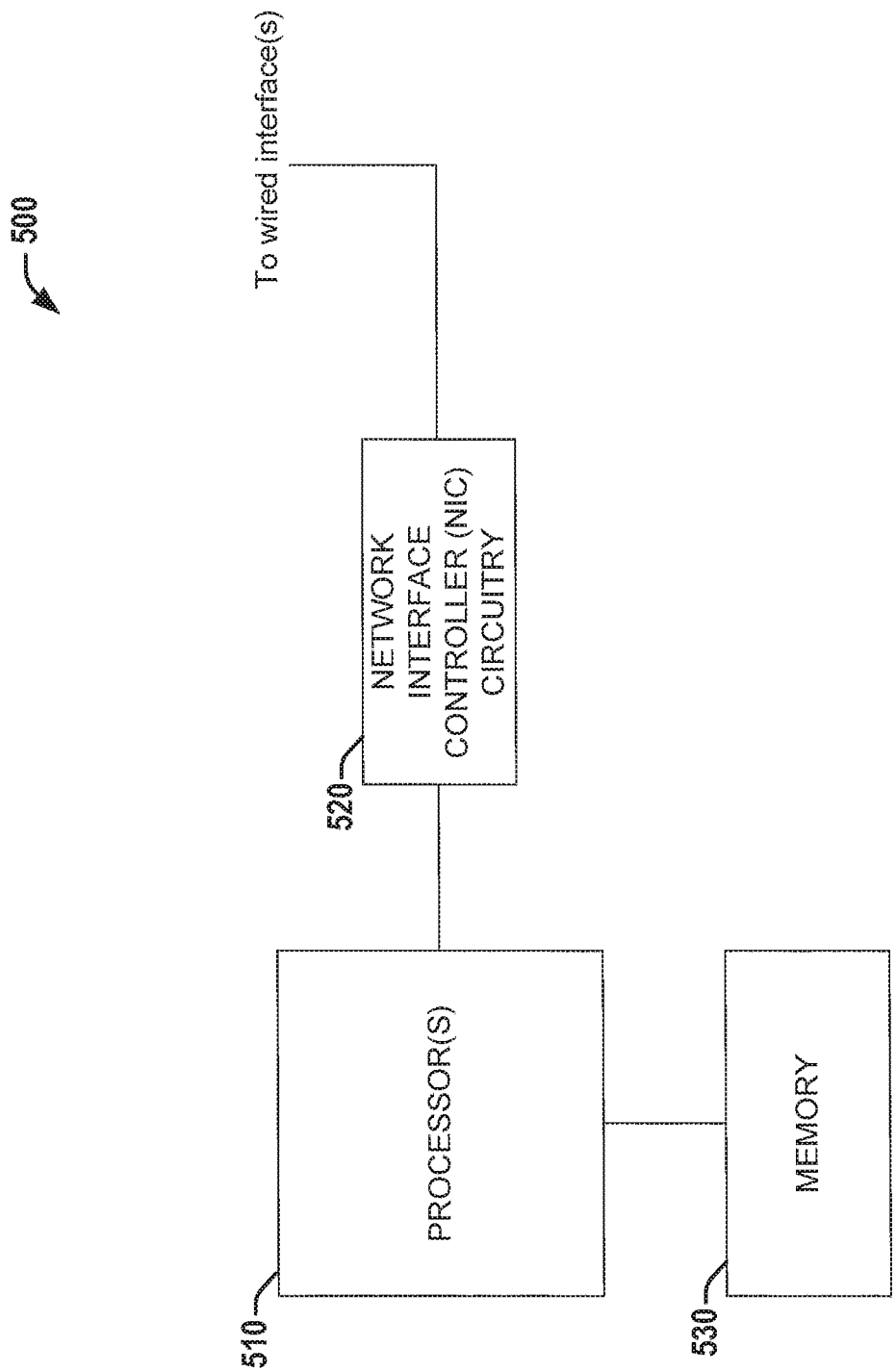
FIG. 5 illustrates a block diagram of an apparatus for use in a mobility management entity (MME) of a wireless communication network, that facilitates handling downlink (DL) data for an idle mode user equipment (UE) in the network, according to the various embodiments described herein.

FIG. 5 illustrates a block diagram of an apparatus 500 for use in a mobility management entity (MME) of a wireless communication network, that facilitates handling downlink (DL) data for an idle mode user equipment (UE) in the network, according to the various embodiments described herein. The apparatus 500 is explained herein with reference to the MME 206 in FIG. 2. The apparatus 500 includes a processing circuitry 510 coupled with an interface circuitry 520. In some embodiments, the apparatus 500 further comprises a memory circuit 530 configured to store instructions and data associated with the SGW-C. In some embodiments, the processing circuitry 510 can comprise one or more processors. In some embodiments, various functions of the processing circuity 510 are performed using different processors. However, in other embodiments, various functions of the processing circuitry 510 can be performed in a single processor. In some embodiments, the memory circuit 530 can be a single memory or a plurality of memories. In some embodiments, the plurality of memories can be in a single location, e.g., a semiconductor chip, or in other embodiments, the plurality of memories can be in different locations. As used herein, the term "circuitry" or "circuit" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The interface circuitry 520 may be configured to communicate with other network entities over various interfaces using appropriate networking communication protocols. The interface circuitry 520 may be capable of communicating over any number of wired or wireless communication interfaces. In some embodiments, the interface circuitry 520 may communicate over Ethernet or other computer networking technologies using a variety of physical media interfaces such as, but not limited to, coaxial, twisted-pair compare, and fiber-optics media interfaces. The processing circuitry 510 may be configured to provide higher-layer operations that include generating and processing signals transmitted and received by the interface circuitry 520.

In some embodiments, the apparatus 500 can be included within the MME 206 in FIG. 2. The processing circuitry 510 is configured to process a first SGW-C downlink (DL) data notification message (e.g., the first SGW-C downlink (DL) data notification message 222) received from a serving gateway control plane (SGW-C) (e.g., the SGW-C 210) associated therewith via the interface circuitry 520. In some embodiments, the first SGW-C DL data notification message indicates an availability of a DL data for an idle mode user equipment (UE) (e.g., the UE 202) served by the MME. In some embodiments, the first SGW-C DL data notification message comprises information on one or more of an allocation and retention priority (ARP), evolved packet system (EPS) bearer ID and paging priority indication associated with the DL data.

Upon receiving the first SGW-C downlink (DL) data notification message, the processing circuitry 510 is configured to generate an MME DL data notification acknowledge message (e.g., the MME DL data notification acknowledge message 224) and provide the generated MME DL data notification acknowledge message to the SGW-C (e.g., the SGW-C 210) via the interface circuitry 520, in response to the first SGW-C DL data notification message. In some embodiments, the MME DL data notification acknowledge message comprises a status information associated with the first SGW-C DL data notification message. In some embodiments, the processing circuitry 510 is further configured to establish evolved packet system (EPS) bearers of the UE (e.g., the UE 202) in the network, based on the received first SGW-C DL data notification message as described in the clause 5.3.4.3 of TS 23.401.

In some embodiments, if a tracking area update (TAU) procedure with the MME change or a routing area update (RAU) procedure is in progress when the MME, (e.g., the MME 206) receives a first SGW-C DL data notification message (e.g., the first SGW-C DL data notification message 222) from the SGW-C 210, the processing circuitry 510 may reject the first SGW-C DL data notification message with an indication that the first SGW-C DL data notification message has been temporarily rejected. In such embodiments, the MME DL data notification ack message to the SGW-C comprises an indication that the first SGW-C DL data notification message has been temporarily rejected.

In some embodiments, if the MME (e.g., the MME 206) identifies that the UE (e.g., the UE 202) is in a power saving state (i.e., a power saving mode) and cannot be reached by paging at the moment, the MME is configured to invoke extended buffering, depending on operator configuration. In such embodiments, the processing circuitry 510 is configured to derive a DL buffering duration time based on an expected time to establish radio bearers to the UE (e.g., the UE 202). In such embodiments, the MME DL data notification ack message to the SGW-C 210 comprises a DL buffering requested indication comprising the derived DL buffering duration time. In some embodiments, the DL buffering duration time indicates to the SGW-C, a delay required to send a subsequent first SGW-C DL notification message to the MME. In some embodiments, the memory circuit 530 is configured to store a value for the DL buffering duration time in the context for the UE.

Figure 6:
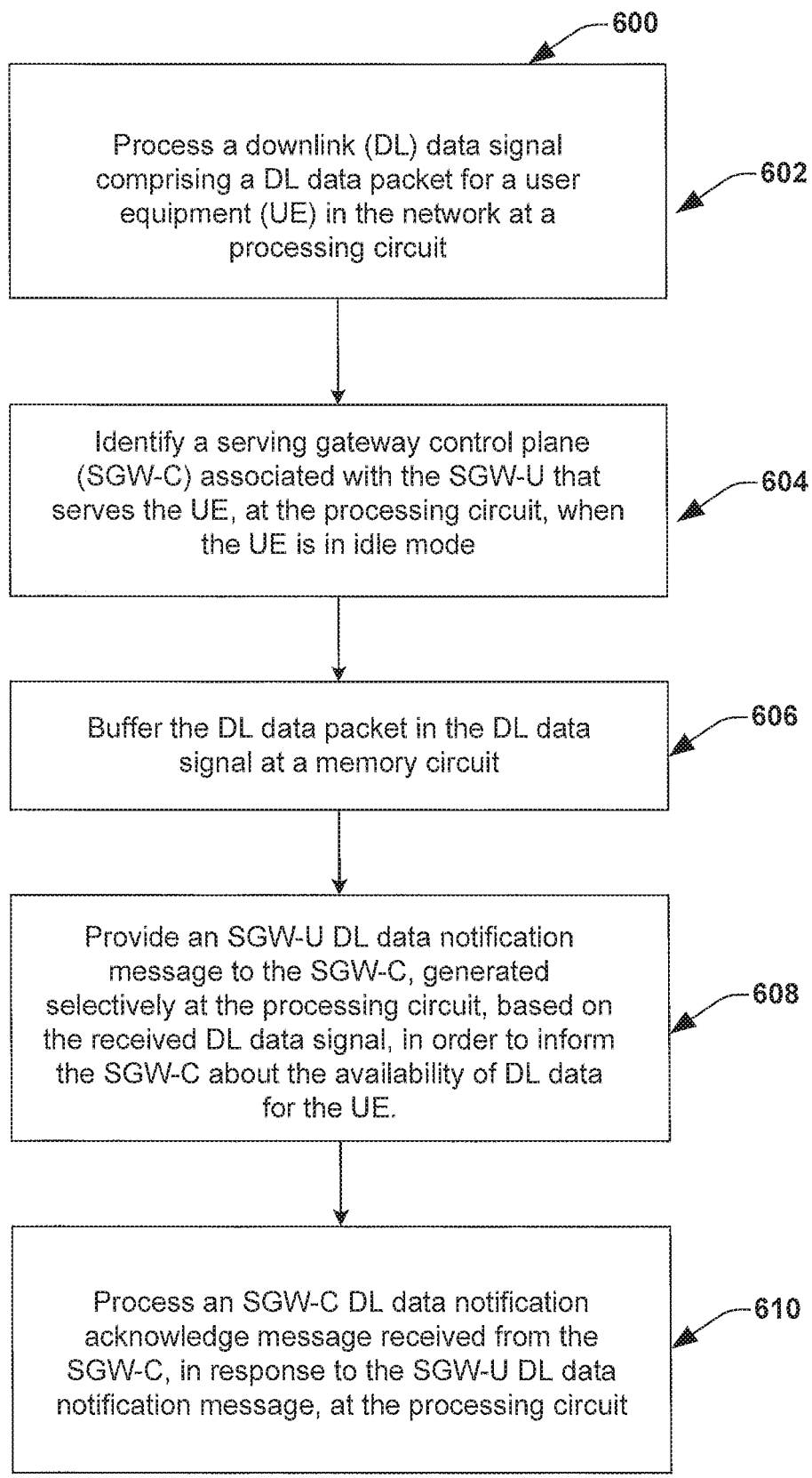
FIG. 6 illustrates a flowchart of a method for a serving gateway user plane (SGW-U) of a wireless communication network that facilitates handling downlink (DL) for an idle mode UE in the network, according to one embodiment of the disclosure.

FIG. 6 illustrates a flowchart of a method 600 for a serving gateway user plane (SGW-U) of a wireless communication network that facilitates handling downlink (DL) for an idle mode UE in the network, according to one embodiment of the disclosure. The method 600 is described herein with reference to the apparatus 300 in FIG. 3 and the wireless communication network 200 in FIG. 2. In some embodiments, the apparatus 300 is included within the SGW-U 212 in FIG. 2. At 602, a DL data signal comprising a DL data packet for a UE in the network is processed in the processing circuit 310. At 604, a serving gateway control plane (SGW-C) associated with the SGW-U that serves the UE is identified at the processing circuit 310, when the UE is in idle mode. At 606, the DL data packet in the DL data signal is stored in the memory circuit 330. At 608, an SGW-U DL data notification message is selectively generated at the processing circuit 310 and provided to the SGW-C, based on a priority of the received DL data signal, in order to inform the SGW-C about the availability of DL data for the UE. At 610, a SGW-C DL data notification acknowledge message received from the SGW-C, in response to the SGW-U DL data notification message, is processed at the processing circuit 310. In some embodiments, the SGW-C DL data notification acknowledge message comprises a status information associated with the SGW-U DL data notification message.

Figure 7:
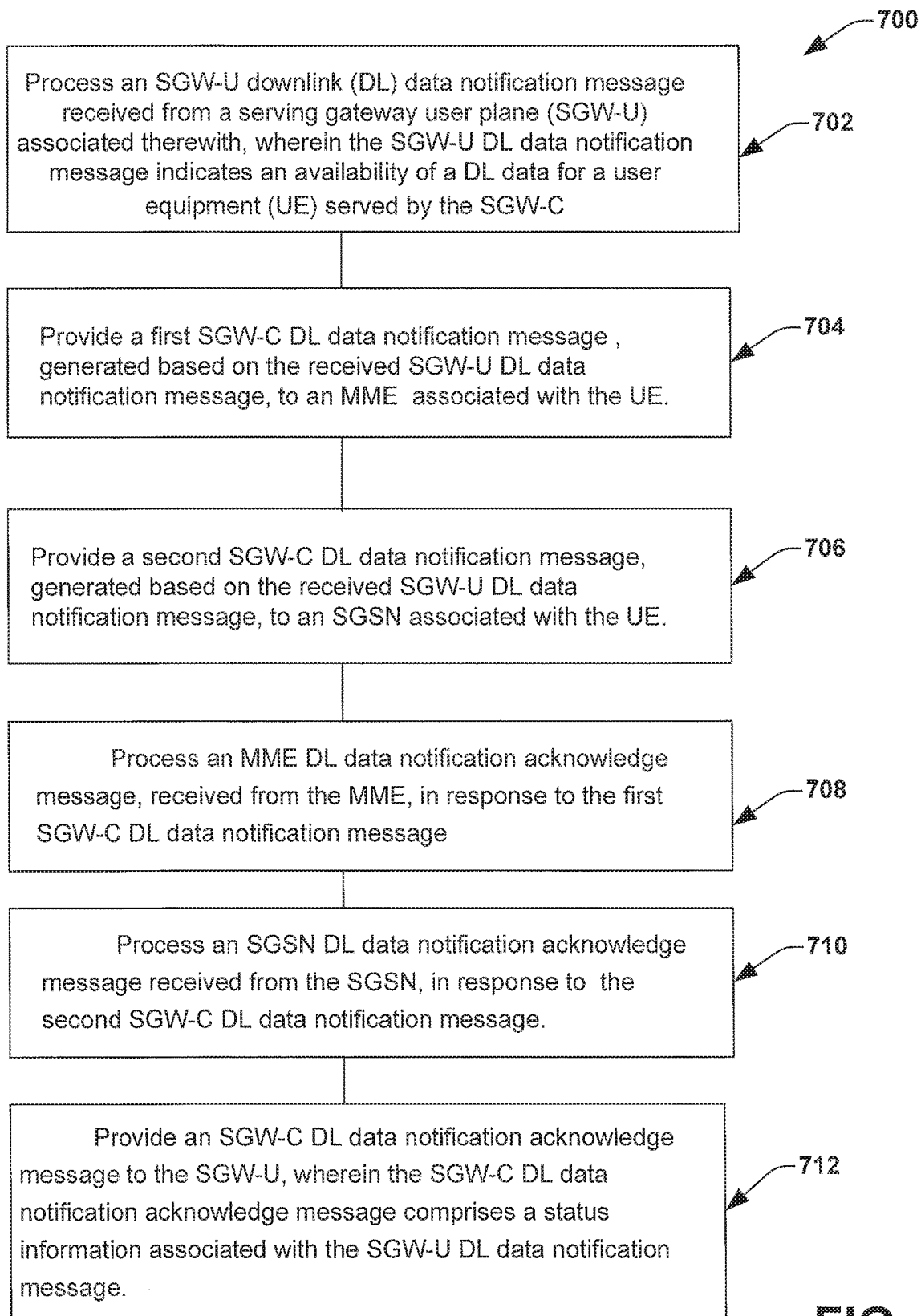
FIG. 7 illustrates a flowchart of a method for a serving gateway control plane (SGW-C) of a wireless communication network that facilitates handling downlink (DL) for an idle mode UE in the network, according to one embodiment of the disclosure.

FIG. 7 illustrates a flowchart of a method 700 for a serving gateway control plane (SGW-C) of a wireless communication network that facilitates handling downlink (DL) for an idle mode UE in the network, according to one embodiment of the disclosure. The method 700 is described herein with reference to the apparatus 400 in FIG. 4 and the wireless communication network 200 in FIG. 2. In some embodiments, the apparatus 400 is included within the SGW-C 210 in FIG. 2. At 702, an SGW-U downlink (DL) data notification message received from a serving gateway user plane (SGW-U) associated with the SGW-C is processed at the processing circuit 410. In some embodiments, the SGW-U downlink (DL) data notification message is received via the interface circuitry 420 and the SGW-U DL data notification message indicates an availability of a DL data for a user equipment (UE) served by the SGW-C.

At 704, a first SGW-C DL data notification message is generated at the processing circuit 410, based on the received SGW-U DL data notification message, and provided to an MME associated with the UE. In some embodiments, the first SGW-C DL data notification message is provided to the MME via the interface circuitry 420 and the first SGW-C DL data notification message indicates an availability of DL data for a UE served by the MME. At 706, a second SGW-C DL data notification message is generated at the processing circuit 410, based on the received SGW-U DL data notification message, and provided to an SGSN associated with the UE. In some embodiments, the second SGW-C DL data notification message is provided to the SGSN via the interface circuitry 420 and the second SGW-C DL data notification message indicates an availability of DL data for a UE served by the SGSN.

At 708, an MME DL data notification acknowledge message received from the MME, in response to the first SGW-C DL data notification message, is processed at the processing circuit 410. In some embodiments, the MME DL data notification acknowledge message is received via the interface circuitry 420 and the MME DL data notification acknowledge message comprises a status information associated with the first SGW-C DL data notification message. At 710, an SGSN DL data notification acknowledge message received from the SGSN, in response to the second SGW-C DL data notification message, is processed at the processing circuit 410. In some embodiments, the SGSN DL data notification acknowledge message is received via the interface circuitry 420 and the SGSN DL data notification acknowledge message comprises a status information associated with the second SGW-C DL data notification message.

At 712, an SGW-C DL data notification acknowledge message is generated at the processing circuit 410 and provided to the SGW-U, wherein the SGW-C DL data notification acknowledge message comprises a status information associated with the SGW-U DL data notification message. In some embodiments, the SGW-C DL data notification acknowledge message is generated at the processing circuit 410, based on the received MME DL data notification acknowledge message. However, in other embodiments, the SGW-C DL data notification acknowledge message is generated at the processing circuit 410, based on the received SGSN DL data notification acknowledge message. In some embodiments, SGW-C DL data notification acknowledge message is provided to the SGW-U via the interface circuitry 420.

Figure 8:
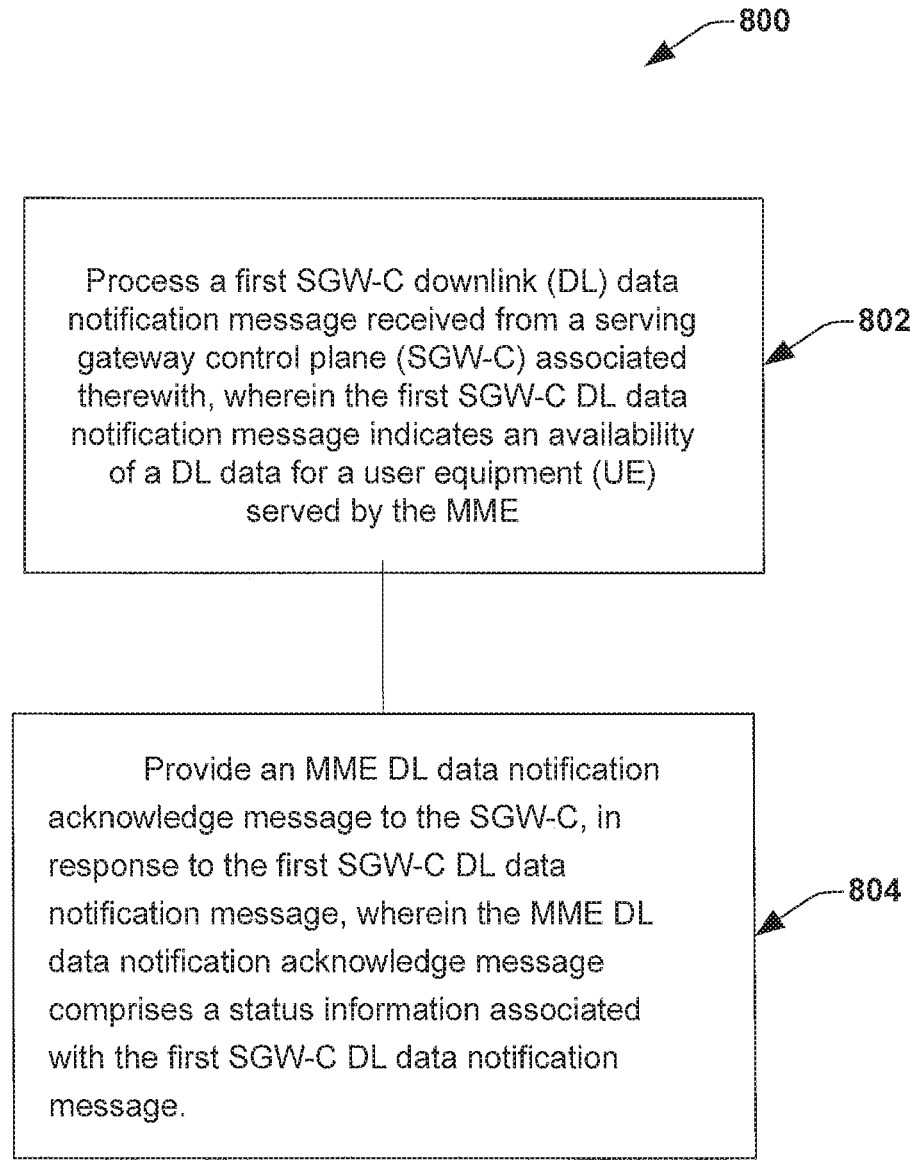
FIG. 8 illustrates a flowchart of a method for a mobility management entity (MME) of a wireless communication network that facilitates handling downlink (DL) for an idle mode UE in the network, according to one embodiment of the disclosure.

FIG. 8 illustrates a flowchart of a method 800 for a mobility management entity (MME) of a wireless communication network that facilitates handling downlink (DL) for an idle mode UE in the network, according to one embodiment of the disclosure. The method 800 is described herein with reference to the apparatus 500 in FIG. 5 and the wireless communication network 200 in FIG. 2. In some embodiments, the apparatus 500 is included within the MME 206 in FIG. 2. At 802, a first SGW-C downlink (DL) data notification message received from a serving gateway control plane (SGW-C) associated with the MME is processed at the processing circuit 510. In some embodiments, the first SGW-C DL data notification message is received via the interface circuitry 520 and the first SGW-C DL data notification message indicates an availability of a DL data for a user equipment (UE) served by the MME. At 804, an MME DL data notification acknowledge message is generated at the processing circuit 510 and provided to the SGW-C, in response to the first SGW-C DL data notification message. In some embodiments, the MME DL data notification acknowledge message comprises a status information associated with the first SGW-C DL data notification message.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 9:
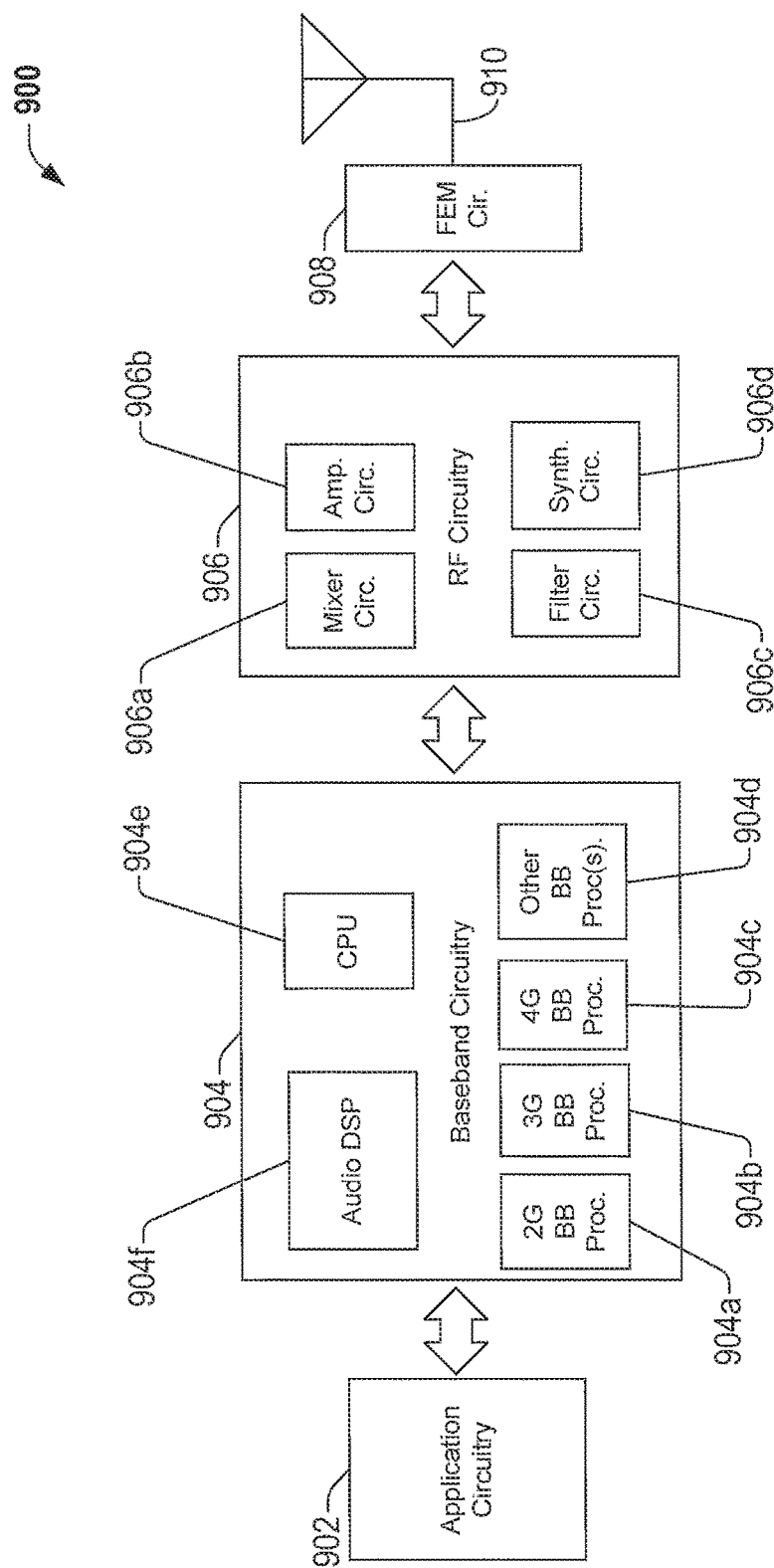
FIG. 9 illustrates, for one embodiment, example components of an electronic device.

Embodiments described herein may be implemented into a system using any suitably configured hardware and/or software. FIG. 9 illustrates, for one embodiment, example components of an electronic device 900. In embodiments, the electronic device 900 may be, implement, be incorporated into, or otherwise be a part of a user equipment (UE), an evolved NodeB (eNB), for example. In some embodiments, the electronic device 100 may include application circuitry 102, baseband circuitry 104, Radio Frequency (RF) circuitry 106, front-end module (FEM) circuitry 108 and one or more antennas 110, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuity 904 may interface with the application circuitry 902 for generation and processing of the baseband signals and for controlling operations of the RF circuitry 906. For example, in some embodiments, the baseband circuitry 904 may include a second generation (2G) baseband processor 904*a*, third generation (3G) baseband processor 904*b*, fourth generation (4G) baseband processor 904*c*, and/or other baseband processor(s) 904*d* for other existing generations, generations in development or to be developed in the future (e.g., fifth generation (5G), 6G, etc.). The baseband circuitry 904 (e.g., one or more of baseband processors 904*a*-*d*) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904*e* of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904*f*. The audio DSP(s) 904*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the electronic device 900 may include additional elements such as, for example, memory/storage, display, camera, sensor, and/or input/output (I/O) interface.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus for use in a serving gateway user plane (SGW-U) of an evolved packet core (EPC) of a wireless communication network, comprising a memory and one or more processors configured to process a downlink (DL) data signal comprising a DL data packet for a user equipment (UE) in the network; buffer the DL data packet; identify a serving gateway control plane (SGW-C) associated with the SGW-U that serves the UE, when the UE is in idle mode; and provide an SGW-U DL data notification message to the SGW-C, generated selectively based on a priority of the received DL data signal, in order to inform the SGW-C about the availability of DL data for the UE.

Example 2 is an apparatus including the subject matter of example 1, wherein the SGW-U DL data notification message to the SGW-C comprises information on one or more of allocation and retention priority (ARP), evolved packet system (EPS) bearer ID and paging priority indication associated with the DL data, and wherein the SGW-U DL data notification message is configured to establish evolved packet system (EPS) bearers of the UE in the network.

Example 3 is an apparatus including the subject matter of examples 1-2, including or omitting elements, wherein the processing circuit is further configured to process a SGW-C DL data notification acknowledge message received from the SGW-C, in response to the SGW-U DL data notification message provided to the SGW-C, wherein the SGW-C DL data notification acknowledge message comprises a status information associated with the SGW-U DL data notification message.

Example 4 is an apparatus including the subject matter of examples 1-3, including or omitting elements, wherein the processing circuit is configured to drop the DL data packet and not generate the SGW-U DL data notification message to the SGW-C, when the DL data packet is received on a low priority bearer, based on a request from the SGW-C or a mobility management entity (MME) associated therewith.

Example 5 is an apparatus including the subject matter of examples 1-4, including or omitting elements, wherein the processing circuit is further configured to introduce a predetermined delay prior to providing the SGW-U DL data notification message to the SGW-C, based on a request to delay sending the SGW-U DL data notification message to the SGW-C, from the SGW-C or a mobility management entity (MME) associated therewith.

Example 6 is an apparatus including the subject matter of examples 1-5, including or omitting elements, wherein the SGW-C DL data notification acknowledge message comprises a DL buffering requested indication comprising the DL buffering duration time that indicates a time required to establish radio bearers of the UE, in order to send the DL data to the UE.

Example 7 is an apparatus including the subject matter of examples 1-6, including or omitting elements, wherein the processing circuit is further configured to introduce a delay corresponding to the DL buffering duration time prior to providing a subsequent SGW-U DL data notification message to the SGW-C, when subsequent data packets are received at the SGW-U before the expiration of the DL buffering duration time.

Example 8 is an apparatus including the subject matter of examples 1-7, including or omitting elements, wherein the SGW-C DL data notification acknowledge message comprises an indication that the SGW-U DL data notification message provided to the SGW-C is temporarily rejected by a mobility management entity MME or a service GPRS support node (SGSN) associated therewith.

Example 9 is an apparatus including the subject matter of examples 1-8, including or omitting elements, wherein the processing circuit is further configured to start a locally configured guard timer having a predetermined delay associated therewith, and buffer subsequent DL data packets, until a modify bearer request message is received from an MME or an SGSN associated therewith, or the guard timer is expired, when the SGW-C DL data notification acknowledge message comprises an indication that the SGW-U DL data notification message is temporarily rejected.

Example 10 is an apparatus including the subject matter of examples 1-9, including or omitting elements, wherein the processing circuit, upon receiving the modify bearer request message, is configured to provide the SGW-U DL data notification message again to the SGW-C, for subsequent transmission to an MME or a SGSN from which the modify bearer request message is received.

Example 11 is an apparatus including the subject matter of examples 1-10, including or omitting elements, wherein the processing circuit is configured to release the buffered DL data packets, if the guard timer is expired or a delete session request message is received from an MME or a SGSN associated therewith, before receiving the modify bearer request message.

Example 12 is an apparatus for use in a serving gateway control plane (SGW-C) of a wireless communication network, comprising a processing circuit configured to process an SGW-U downlink (DL) data notification message received from a serving gateway user plane (SGW-U) associated therewith, wherein the SGW-U DL data notification message indicates an availability of a DL data for a user equipment (UE) served by the SGW-C; and provide a SGW-C DL data notification acknowledge message to the SGW-U, in response to the SGW-U DL data notification message, wherein the SGW-C DL data notification acknowledge message comprises a status information associated with the SGW-U DL data notification message.

Example 13 is an apparatus including the subject matter of example 12, wherein the processing circuit is further configured to provide a first SGW-C DL data notification message, generated based on the received SGW-U DL data notification message, to a mobility management entity (MME) associated with the UE, prior to providing the SGW-C DL data notification acknowledge message to the SGW-U and wherein the first SGW-C DL data notification message provides to the MME, an indication of the availability of the DL data for the UE.

Example 14 is an apparatus including the subject matter of examples 12-13, including or omitting elements, wherein the first SGW-C DL data notification message to the SGW-C comprises information on one or more of an allocation and retention priority (ARP), evolved packet system (EPS) bearer ID and paging priority indication associated with the DL data, and wherein the first SGW-C DL data notification message is configured to establish evolved packet system (EPS) bearers of the UE in the network.

Example 15 is an apparatus including the subject matter of examples 12-14, including or omitting elements, wherein the processing circuit is further configured to provide a second SGW-C DL data notification message, generated based on the received SGW-U DL data notification message, to a service GPRS support node (SGSN) associated with the UE, in order to transfer the DL data to the UE, prior to providing the SGW-C DL data notification acknowledge message to the SGW-U, wherein the second SGW-C DL data notification message comprises an indication of the availability of the DL data for the UE.

Example 16 is an apparatus including the subject matter of examples 12-15, including or omitting elements, wherein the processing circuit is further configured to process an MME DL data notification acknowledge message received from the MME, in response to the first SGW-C DL data notification message, prior to providing the SGW-C DL data notification acknowledge message to the SGW-U, wherein the MME DL data notification acknowledge message comprises a status information associated with the first SGW-C DL data notification message, and wherein the SGW-C DL data notification acknowledge message to the SGW-U is generated based on the received MME DL data notification acknowledge message.

Example 17 is an apparatus including the subject matter of examples 12-16, including or omitting elements, wherein the processing circuit is further configured to process an SGSN DL data notification acknowledge message received from the SGSN, in response to the second SGW-C DL data notification message from the SGW-C, prior to providing the SGW-C DL data notification acknowledge message to the SGW-U, wherein the SGSN DL data notification acknowledge message comprises a status information associated with the second SGW-C DL data notification message, and wherein the SGW-C DL data notification acknowledge message to the SGW-U is generated based on the received SGSN DL data notification acknowledge message.

Example 18 is an apparatus for use in a mobility management entity (MME) of a wireless communication network, comprising a processing circuit configured to process a first SGW-C downlink (DL) data notification message received from a serving gateway control plane (SGW-C) associated therewith, wherein the first SGW-C DL data notification message indicates an availability of a DL data for a user equipment (UE) served by the MME; and provide an MME DL data notification acknowledge message to the SGW-C, in response to the first SGW-C DL data notification message, wherein the MME DL data notification acknowledge message comprises a status information associated with the first SGW-C DL data notification message.

Example 19 is an apparatus including the subject matter of example 18, wherein the first SGW-C DL data notification message comprises information on one or more of an allocation and retention priority (ARP), evolved packet system (EPS) bearer ID and paging priority indication associated with the DL data, and wherein the MME is configured to establish evolved packet system (EPS) bearers of the UE in the network, based on the received first SGW-C DL data notification message.

Example 20 is an apparatus including the subject matter of examples 18-19, including or omitting elements, wherein the processing circuit is further configured to derive a DL buffering duration time required to establish radio bearers of the UE, when the UE is in a power saving mode, and wherein the MME DL data notification acknowledge message comprises a DL buffering requested indication comprising the DL buffering duration time.

Example 21 is an apparatus including the subject matter of examples 18-20, including or omitting elements, wherein the processing circuit is configured to reject the first SGW-C DL data notification message from the SGW-C, when a tracking area update (TAU) procedure with the MME change or a routing area update (RAU) procedure of the MME is in progress, and wherein the MME DL data notification acknowledge message comprises an indication that the first SGW-C DL data notification message has been temporarily rejected.

Example 22 is a computer-readable medium storing executable instructions that, in response to execution, cause one or more processors of a serving gateway user plane (SGW-U) of an evolved packet core (EPC) of a wireless communication network, to perform operations comprising processing a downlink (DL) data signal comprising a DL data packet for a user equipment (UE) in the network; buffering the DL data packet; identifying a serving gateway control plane (SGW-C) associated with the SGW-U that serves the UE, when the UE is in idle mode; and providing an SGW-U DL data notification message to the SGW-C, generated selectively based on a priority of the received DL data signal, in order to inform the SGW-C about the availability of DL data for the UE.

Example 23 is a computer-readable medium including the subject matter of example 22, wherein the SGW-U DL data notification message to the SGW-C comprises information on one or more of allocation and retention priority (ARP), evolved packet system (EPS) bearer ID and paging priority indication associated with the DL data, and wherein the SGW-U DL data notification message is configured to establish evolved packet system (EPS) bearers of the UE in the network.

Example 24 is a computer-readable medium including the subject matter of examples 22-23, including or omitting elements, further cause the one or more processors to process a SGW-C DL data notification acknowledge message received from the SGW-C, in response to the SGW-U DL data notification message provided to the SGW-C, wherein the SGW-C DL data notification acknowledge message comprises a status information associated with the SGW-U DL data notification message.

Example 25 is a computer-readable medium including the subject matter of examples 22-24, including or omitting elements, further cause the one or more processors to drop the DL data packet and not generate the SGW-U DL data notification message to the SGW-C, when the DL data packet is received on a low priority bearer, based on a request from the SGW-C or a mobility management entity (MME) associated therewith.

Example 26 is a computer-readable medium including the subject matter of examples 22-25, including or omitting elements, further cause the one or more processors to introduce a predetermined delay prior to providing the SGW-U DL data notification message to the SGW-C, based on a request to delay sending the SGW-U DL data notification message to the SGW-C, from the SGW-C or a mobility management entity (MME) associated therewith.

Example 27 is a computer-readable medium including the subject matter of examples 22-26, including or omitting elements, wherein the SGW-C DL data notification acknowledge message comprises a DL buffering requested indication comprising the DL buffering duration time that indicates a time required to establish radio bearers of the UE, in order to send the DL data to the UE.

Example 28 is a computer-readable medium including the subject matter of examples 22-27, including or omitting elements, further cause the one or more processors to introduce a delay corresponding to the DL buffering duration time prior to providing a subsequent SGW-U DL data notification message to the SGW-C, when subsequent data packets are received at the SGW-U before the expiration of the DL buffering duration time.

Example 29 is a computer-readable medium including the subject matter of examples 22-28, including or omitting elements, wherein the SGW-C DL data notification acknowledge message comprises an indication that the SGW-U DL data notification message provided to the SGW-C is temporarily rejected by a mobility management entity MME or a service GPRS support node (SGSN) associated therewith.

Example 30 is a computer-readable medium including the subject matter of examples 22-29, including or omitting elements, further cause the one or more processors to start a locally configured guard timer having a predetermined delay associated therewith, and buffer subsequent DL data packets, until a modify bearer request message is received from an MME or an SGSN associated therewith, or the guard timer is expired, when the SGW-C DL data notification acknowledge message comprises an indication that the SGW-U DL data notification message is temporarily rejected.

Example 31 is a computer-readable medium including the subject matter of examples 22-30, including or omitting elements, upon receiving the modify bearer request message, further cause the one or more processors to provide the SGW-U DL data notification message again to the SGW-C, for subsequent transmission to an MME or a SGSN from which the modify bearer request message is received.

Example 32 is a computer-readable medium including the subject matter of examples 22-31, including or omitting elements, further cause the one or more processors to release the buffered DL data packets, if the guard timer is expired or a delete session request message is received from an MME or a SGSN associated therewith, before receiving the modify bearer request message.

Example 33 is a computer-readable medium storing executable instructions that, in response to execution, cause one or more processors of a serving gateway control plane (SGW-C) of a wireless communication network, to perform operations comprising processing an SGW-U downlink (DL) data notification message received from a serving gateway user plane (SGW-U) associated therewith, wherein the SGW-U DL data notification message indicates an availability of a DL data for a user equipment (UE) served by the SGW-C; and providing a SGW-C DL data notification acknowledge message to the SGW-U, in response to the SGW-U DL data notification message, wherein the SGW-C DL data notification acknowledge message comprises a status information associated with the SGW-U DL data notification message.

Example 34 is a computer-readable medium including the subject matter of example 33, further cause the one or more processors to provide a first SGW-C DL data notification message, generated based on the received SGW-U DL data notification message, to a mobility management entity (MME) associated with the UE, prior to providing the SGW-C DL data notification acknowledge message to the SGW-U and wherein the first SGW-C DL data notification message provides to the MME, an indication of the availability of the DL data for the UE.

Example 35 is a computer-readable medium including the subject matter of examples 33-34, including or omitting elements, wherein the first SGW-C DL data notification message to the SGW-C comprises information on one or more of an allocation and retention priority (ARP), evolved packet system (EPS) bearer ID and paging priority indication associated with the DL data, and wherein the first SGW-C DL data notification message is configured to establish evolved packet system (EPS) bearers of the UE in the network.

Example 36 is a computer-readable medium including the subject matter of examples 33-35, including or omitting elements, further cause the one or more processors to provide a second SGW-C DL data notification message, generated based on the received SGW-U DL data notification message, to a service GPRS support node (SGSN) associated with the UE, in order to transfer the DL data to the UE, prior to providing the SGW-C DL data notification acknowledge message to the SGW-U, wherein the second SGW-C DL data notification message comprises an indication of the availability of the DL data for the UE.

Example 37 is a computer-readable medium including the subject matter of examples 33-36, including or omitting elements, further cause the one or more processors to process an MME DL data notification acknowledge message received from the MME, in response to the first SGW-C DL data notification message, prior to providing the SGW-C DL data notification acknowledge message to the SGW-U, wherein the MME DL data notification acknowledge message comprises a status information associated with the first SGW-C DL data notification message, and wherein the SGW-C DL data notification acknowledge message to the SGW-U is generated based on the received MME DL data notification acknowledge message.

Example 38 is a computer-readable medium including the subject matter of examples 33-37, including or omitting elements, further cause the one or more processors to process an SGSN DL data notification acknowledge message received from the SGSN, in response to the second SGW-C DL data notification message from the SGW-C, prior to providing the SGW-C DL data notification acknowledge message to the SGW-U, wherein the SGSN DL data notification acknowledge message comprises a status information associated with the second SGW-C DL data notification message, and wherein the SGW-C DL data notification acknowledge message to the SGW-U is generated based on the received SGSN DL data notification acknowledge message.

Example 39 is a computer-readable medium storing executable instructions that, in response to execution, cause one or more processors of a mobility management entity (MME) of a wireless communication network, to perform operations comprising processing a first SGW-C downlink (DL) data notification message received from a serving gateway control plane (SGW-C) associated therewith, wherein the first SGW-C DL data notification message indicates an availability of a DL data for a user equipment (UE) served by the MME; and providing an MME DL data notification acknowledge message to the SGW-C, in response to the first SGW-C DL data notification message, wherein the MME DL data notification acknowledge message comprises a status information associated with the first SGW-C DL data notification message.

Example 40 is a computer-readable medium including the subject matter of example 39, wherein the first SGW-C DL data notification message comprises information on one or more of an allocation and retention priority (ARP), evolved packet system (EPS) bearer ID and paging priority indication associated with the DL data, and wherein the MME is configured to establish evolved packet system (EPS) bearers of the UE in the network, based on the received first SGW-C DL data notification message.

Example 41 is a computer-readable medium including the subject matter of examples 39-40, including or omitting elements, further cause the one or more processors to derive a DL buffering duration time required to establish radio bearers of the UE, when the UE is in a power saving mode, and wherein the MME DL data notification acknowledge message comprises a DL buffering requested indication comprising the DL buffering duration time.

Example 42 is a computer-readable medium including the subject matter of examples 39-41, including or omitting elements, further cause the one or more processors to reject the first SGW-C DL data notification message from the SGW-C, when a tracking area update (TAU) procedure with the MME change or a routing area update (RAU) procedure of the MME is in progress, and wherein the MME DL data notification acknowledge message comprises an indication that the first SGW-C DL data notification message has been temporarily rejected.

Example 43 is an apparatus for use in a serving gateway user plane (SGW-U) of an evolved packet core (EPC) of a wireless communication network, comprising means for processing a downlink (DL) data signal comprising a DL data packet for a user equipment (UE) in the network; means for buffering the DL data packet; means for identifying a serving gateway control plane (SGW-C) associated with the SGW-U that serves the UE, when the UE is in idle mode; and means for providing an SGW-U DL data notification message to the SGW-C, generated selectively based on a priority of the received DL data signal, in order to inform the SGW-C about the availability of DL data for the UE. In some embodiments, the means for performing the various functions comprises one or more processors, wherein the various functions are performed in different processors. However, in other embodiments, the various functions can be performed in a same processor.

Example 44 is an apparatus including the subject matter of example 43, wherein the SGW-U DL data notification message to the SGW-C comprises information on one or more of allocation and retention priority (ARP), evolved packet system (EPS) bearer ID and paging priority indication associated with the DL data, and wherein the SGW-U DL data notification message is configured to establish evolved packet system (EPS) bearers of the UE in the network.

Example 45 is an apparatus including the subject matter of examples 43-44, including or omitting elements, further comprising means for processing a SGW-C DL data notification acknowledge message received from the SGW-C, in response to the SGW-U DL data notification message provided to the SGW-C, wherein the SGW-C DL data notification acknowledge message comprises a status information associated with the SGW-U DL data notification message.

Example 46 is an apparatus including the subject matter of examples 43-45, including or omitting elements, further comprising means for dropping the DL data packet and not generating the SGW-U DL data notification message to the SGW-C, when the DL data packet is received on a low priority bearer, based on a request from the SGW-C or a mobility management entity (MME) associated therewith.

Example 47 is an apparatus including the subject matter of examples 43-46, including or omitting elements, further comprising means for introducing a predetermined delay prior to providing the SGW-U DL data notification message to the SGW-C, based on a request to delay sending the SGW-U DL data notification message to the SGW-C, from the SGW-C or a mobility management entity (MME) associated therewith.

Example 48 is an apparatus including the subject matter of examples 43-47, including or omitting elements, wherein the SGW-C DL data notification acknowledge message comprises a DL buffering requested indication comprising the DL buffering duration time that indicates a time required to establish radio bearers of the UE, in order to send the DL data to the UE.

Example 49 is an apparatus including the subject matter of examples 43-48, including or omitting elements, further comprising means for introducing a delay corresponding to the DL buffering duration time prior to providing a subsequent SGW-U DL data notification message to the SGW-C, when subsequent data packets are received at the SGW-U before the expiration of the DL buffering duration time.

Example 50 is an apparatus including the subject matter of examples 43-49, including or omitting elements, wherein the SGW-C DL data notification acknowledge message comprises an indication that the SGW-U DL data notification message provided to the SGW-C is temporarily rejected by a mobility management entity MME or a service GPRS support node (SGSN) associated therewith.

Example 51 is an apparatus including the subject matter of examples 43-50, including or omitting elements, further comprising means for starting a locally configured guard timer having a predetermined delay associated therewith, and buffering subsequent DL data packets, until a modify bearer request message is received from an MME or an SGSN associated therewith, or the guard timer is expired, when the SGW-C DL data notification acknowledge message comprises an indication that the SGW-U DL data notification message is temporarily rejected.

Example 52 is an apparatus including the subject matter of examples 43-51, including or omitting elements, further comprising means for providing the SGW-U DL data notification message again to the SGW-C, upon receiving the modify bearer request message, for subsequent transmission to an MME or a SGSN from which the modify bearer request message is received.

Example 53 is an apparatus including the subject matter of examples 43-52, including or omitting elements, further comprising means for releasing the buffered DL data packets, if the guard timer is expired or a delete session request message is received from an MME or a SGSN associated therewith, before receiving the modify bearer request message.

Example 54 is an apparatus including the subject matter of examples 43-53, including or omitting elements, further comprising means for storing the buffered data packet. In some embodiments, the means for performing the above function comprises a memory.

Example 55 is an apparatus for use in a serving gateway control plane (SGW-C) of a wireless communication network, comprising means for processing an SGW-U downlink (DL) data notification message received from a serving gateway user plane (SGW-U) associated therewith, wherein the SGW-U DL data notification message indicates an availability of a DL data for a user equipment (UE) served by the SGW-C; and means for providing a SGW-C DL data notification acknowledge message to the SGW-U, in response to the SGW-U DL data notification message, wherein the SGW-C DL data notification acknowledge message comprises a status information associated with the SGW-U DL data notification message. In some embodiments, the means for performing the various functions comprises one or more processors, wherein the various functions are performed in different processors. However, in other embodiments, the various functions can be performed in a same processor.

Example 56 is an apparatus including the subject matter of example 55, further comprising means for providing a first SGW-C DL data notification message, generated based on the received SGW-U DL data notification message, to a mobility management entity (MME) associated with the UE, prior to providing the SGW-C DL data notification acknowledge message to the SGW-U and wherein the first SGW-C DL data notification message provides to the MME, an indication of the availability of the DL data for the UE.

Example 57 is an apparatus including the subject matter of examples 55-56, including or omitting elements, wherein the first SGW-C DL data notification message to the SGW-C comprises information on one or more of an allocation and retention priority (ARP), evolved packet system (EPS) bearer ID and paging priority indication associated with the DL data, and wherein the first SGW-C DL data notification message is configured to establish evolved packet system (EPS) bearers of the UE in the network.

Example 58 is an apparatus including the subject matter of examples 55-57, including or omitting elements, further comprising means for providing a second SGW-C DL data notification message, generated based on the received SGW-U DL data notification message, to a service GPRS support node (SGSN) associated with the UE, in order to transfer the DL data to the UE, prior to providing the SGW-C DL data notification acknowledge message to the SGW-U, wherein the second SGW-C DL data notification message comprises an indication of the availability of the DL data for the UE.

Example 59 is an apparatus including the subject matter of examples 55-58, including or omitting elements, further comprising means for processing an MME DL data notification acknowledge message received from the MME, in response to the first SGW-C DL data notification message, prior to providing the SGW-C DL data notification acknowledge message to the SGW-U, wherein the MME DL data notification acknowledge message comprises a status information associated with the first SGW-C DL data notification message, and wherein the SGW-C DL data notification acknowledge message to the SGW-U is generated based on the received MME DL data notification acknowledge message.

Example 60 is an apparatus including the subject matter of examples 55-59, including or omitting elements, further comprising means for processing an SGSN DL data notification acknowledge message received from the SGSN, in response to the second SGW-C DL data notification message from the SGW-C, prior to providing the SGW-C DL data notification acknowledge message to the SGW-U, wherein the SGSN DL data notification acknowledge message comprises a status information associated with the second SGW-C DL data notification message, and wherein the SGW-C DL data notification acknowledge message to the SGW-U is generated based on the received SGSN DL data notification acknowledge message.

Example 61 is an apparatus for use in a mobility management entity (MME) of a wireless communication network, comprising means for processing a first SGW-C downlink (DL) data notification message received from a serving gateway control plane (SGW-C) associated therewith, wherein the first SGW-C DL data notification message indicates an availability of a DL data for a user equipment (UE) served by the MME; and means for providing an MME DL data notification acknowledge message to the SGW-C, in response to the first SGW-C DL data notification message, wherein the MME DL data notification acknowledge message comprises a status information associated with the first SGW-C DL data notification message. In some embodiments, the means for performing the various functions comprises one or more processors, wherein the various functions are performed in different processors. However, in other embodiments, the various functions can be performed in a same processor.

Example 62 is an apparatus including the subject matter of example 61, wherein the first SGW-C DL data notification message comprises information on one or more of an allocation and retention priority (ARP), evolved packet system (EPS) bearer ID and paging priority indication associated with the DL data, and wherein the MME is configured to establish evolved packet system (EPS) bearers of the UE in the network, based on the received first SGW-C DL data notification message.

Example 63 is an apparatus including the subject matter of examples 61-62, including or omitting elements, further comprising means for deriving a DL buffering duration time required to establish radio bearers of the UE, when the UE is in a power saving mode, and wherein the MME DL data notification acknowledge message comprises a DL buffering requested indication comprising the DL buffering duration time.

Example 64 is an apparatus including the subject matter of examples 61-63, including or omitting elements, further comprising means for rejecting the first SGW-C DL data notification message from the SGW-C, when a tracking area update (TAU) procedure with the MME change or a routing area update (RAU) procedure of the MME is in progress, and wherein the MME DL data notification acknowledge message comprises an indication that the first SGW-C DL data notification message has been temporarily rejected.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a serving gateway user plane (SGW-U) comprising a user plane node associated with a serving gateway (SGW) of an evolved packet core (EPC) of a wireless communication network, the apparatus comprising:
    one or more processors configured to:
    process a received downlink (DL) data signal comprising a DL data packet for a user equipment (UE) in the wireless communication network;
    buffer the DL data packet;
    identify a serving gateway control plane (SGW-C) associated with the SGW-U that serves the UE, wherein the SGW-C comprises a control plane node associated with the SGW;
    provide an SGW-U DL data notification message to the SGW-C, in order to inform the SGW-C about an availability of the DL data packet for the UE;
    process an SGW-C DL data notification acknowledge message received from the SGW-C, in response to the SGW-U DL data notification message provided to the SGW-C, wherein the SGW-C DL data notification acknowledge message comprises a DL buffering requested indication comprising a DL buffering duration time; and
    introduce a delay corresponding to the DL buffering duration time prior to providing a subsequent SGW-U DL data notification message to the SGW-C, when subsequent data packets are received at the SGW-U before an expiration of the DL buffering duration time.

2. The apparatus of claim 1, wherein the SGW-U DL data notification message to the SGW-C comprises information on one or more of allocation and retention priority (ARP), evolved packet system (EPS) bearer ID and paging priority indication associated with the DL data packet, and wherein the SGW-U DL data notification message is configured to establish evolved packet system (EPS) bearers of the UE in the wireless communication network.

3. The apparatus of claim 1, wherein the one or more processors are further configured to drop the DL data packet and not generate the SGW-U DL data notification message to the SGW-C, when the DL data packet is received on a low priority bearer, based on a request from the SGW-C or a mobility management entity (MME) associated therewith.

4. The apparatus of claim 1, wherein the one or more processors are configured to introduce a predetermined delay prior to providing the SGW-U DL data notification message to the SGW-C, based on a request to delay sending the SGW-U DL data notification message to the SGW-C, received from the SGW-C associated therewith.

5. The apparatus of claim 1, wherein the DL buffering duration time indicates a time required to establish radio bearers of the UE, in order to send the DL data to the UE.

6. The apparatus of claim 1, wherein the SGW-C DL data notification acknowledge message comprises an indication that the SGW-U DL data notification message provided to the SGW-C is temporarily rejected by a mobility management entity (MME) or a service GPRS support node (SGSN) associated therewith.

7. The apparatus of claim 6, wherein the one or more processors are further configured to start a locally configured guard timer having a predetermined delay associated therewith, and buffer subsequent DL data packets, until a modify bearer request message is received from a second MME or a second SGSN associated therewith, or the locally configured guard timer is expired, when the SGW-C DL data notification acknowledge message comprises the indication that the SGW-U DL data notification message is temporarily rejected.

8. The apparatus of claim 7, wherein, upon receiving the modify bearer request message, the one or more processors are further configured to provide the SGW-U DL data notification message again to the SGW-C, for subsequent transmission to the second MME or the second SGSN from which the modify bearer request message is received.

9. The apparatus of claim 7, wherein the one or more processors are further configured to release the buffered DL data packets, if the locally configured guard timer is expired or a delete session request message is received from an MME or an SGSN associated therewith, before receiving the modify bearer request message.

10. An apparatus for a serving gateway control plane (SGW-C) comprising a control plane node associated with a serving gateway (SGW) of a wireless communication network, the apparatus comprising:
    one or more processors configured to:
    process a serving gateway user plane (SGW-U) downlink (DL) data notification message received from a serving gateway user plane (SGW-U) comprising a user plane node associated with the SGW, wherein the SGW-U DL data notification message indicates an availability of a DL data for a user equipment (UE) served by the SGW-C;

provide a first SGW-C DL data notification message, generated based on the SGW-U DL data notification message, to a mobility management entity (MME) associated with the UE;

process an MME DL data notification acknowledge (ACK) message received from the MME, in response to providing the first SGW-C DL data notification message to the MME, wherein the MME DL data notification ACK message comprises a DL buffering duration time; and provide an SGW-C DL data notification acknowledge message to the SGW-U, in response to processing the MME DL data notification ACK message from the MME, wherein the SGW-C DL data notification acknowledge message comprises a status information associated with the SGW-U DL data notification message and the DL buffering duration time, wherein the DL buffering duration time causes the SGW-U to introduce a delay corresponding to the DL buffering duration time prior to providing a subsequent SGW-U DL data notification message to the SGW-C, when subsequent data packets are received at the SGW-U before an expiration of the DL buffering duration time.

11. The apparatus of claim 10, wherein the first SGW-C DL data notification message provides to the MME, an indication of the availability of the DL data for the UE.

12. The apparatus of claim 11, wherein the first SGW-C DL data notification message to the SGW-C comprises information on one or more of an allocation and retention priority (ARP), evolved packet system (EPS) bearer ID and paging priority indication associated with the DL data, and wherein the first SGW-C DL data notification message is configured to establish evolved packet system (EPS) bearers of the UE in the wireless communication network.

13. The apparatus of claim 10, wherein the one or more processors are further configured to provide a second SGW-C DL data notification message, generated based on the SGW-U DL data notification message, to a service GPRS support node (SGSN) associated with the UE, in order to transfer the DL data to the UE, prior to providing the SGW-C DL data notification acknowledge message to the SGW-U, wherein the second SGW-C DL data notification message comprises an indication of the availability of the DL data for the UE.

14. The apparatus of claim 13, wherein the one or more processors are further configured to:

process an SGSN DL data notification acknowledge message received from the SGSN, in response to the second SGW-C DL data notification message from the SGW-C, prior to providing the SGW-C DL data notification acknowledge message to the SGW-U, wherein the SGSN DL data notification acknowledge message comprises a status information associated with the second SGW-C DL data notification message, and wherein the SGW-C DL data notification acknowledge message to the SGW-U is generated based on the SGSN DL data notification acknowledge message.

15. A non-transitory computer-readable medium storing executable instructions that, in response to execution, cause one or more processors of a mobility management entity (MME) of a wireless communication network, to perform operations comprising:

processing a first serving gateway control plane (SGW-C) downlink (DL) data notification message received from a serving gateway control plane (SGW-C) comprising a control plane node associated with a serving gateway (SGW), wherein the first SGW-C DL data notification message indicates an availability of a DL data for a user equipment (UE) served by the MME; and providing an MME DL data notification acknowledge message to the SGW-C, in response to the first SGW-C DL data notification message, wherein the MME DL data notification acknowledge message comprises a status information associated with the first SGW-C DL data notification message and a DL buffering requested indication comprising a DL buffering duration time, wherein the MME DL data notification acknowledge message causes the SGW-C to provide an SGW-C DL data notification acknowledge message comprising the DLexper buffering duration time to a serving gateway user plane (SGW-U) comprising a user plane node associated with the SGW to cause the SGW-U to introduce a delay corresponding to the DL buffering duration time prior to providing a subsequent SGW-U DL data notification message to the SGW-C, when subsequent data packets are received at the SGW-U before an expiration of the DL buffering duration time.

16. The non-transitory computer-readable medium of claim 15, wherein the first SGW-C DL data notification message comprises information on one or more of an allocation and retention priority (ARP), evolved packet system (EPS) bearer ID and paging priority indication associated with the DL data, and wherein the MME is configured to establish evolved packet system (EPS) bearers of the UE in the wireless communication network, based on the first SGW-C DL data notification message.

17. The non-transitory computer-readable medium of claim 15, wherein the operations further comprise deriving the DL buffering duration time required to establish radio bearers of the UE, when the UE is in a power saving mode.

18. The non-transitory computer-readable medium of claim 15, wherein the operations further comprise rejecting the first SGW-C DL data notification message from the SGW-C, when a tracking area update (TAU) procedure with the MME changes or a routing area update (RAU) procedure of the MME is in progress, and wherein the MME DL data notification acknowledge message comprises an indication that the first SGW-C DL data notification message has been temporarily rejected.

19. The apparatus of claim 10, wherein the one or more processors are further configured to provide a request to delay sending the SGW-U DL data notification message to the SGW-C, to the SGW-U.

* * * * *